United States Patent
Chen et al.

(10) Patent No.: US 12,386,245 B2
(45) Date of Patent: Aug. 12, 2025

(54) OFF-AXIS LIGHT EMITTING DEVICE AND IMAGE CAPTURING MODULE USING THE SAME

(71) Applicant: LITE-ON TECHNOLOGY CORPORATION, Taipei (TW)

(72) Inventors: Yun-Ta Chen, New Taipei (TW); Ming-Shiou Tsai, Taoyuan (TW); Yu-Yu Chang, Taipei (TW); Chien-Shun Huang, Changhua County (TW); Meng-Sung Chou, New Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 7 days.

(21) Appl. No.: 17/736,052

(22) Filed: May 3, 2022

(65) Prior Publication Data

US 2023/0057694 A1 Feb. 23, 2023

Related U.S. Application Data

(60) Provisional application No. 63/235,114, filed on Aug. 19, 2021.

(30) Foreign Application Priority Data

Jan. 14, 2022 (CN) .......................... 202210041441.0

(51) Int. Cl.
*G03B 15/05* (2021.01)

(52) U.S. Cl.
CPC .................................... *G03B 15/05* (2013.01)

(58) Field of Classification Search
None
See application file for complete search history.

(56) References Cited

U.S. PATENT DOCUMENTS

| | | | |
|---|---|---|---|
| 7,758,210 B2 * | 7/2010 | Peck | F21V 5/04 362/540 |
| 11,077,959 B2 * | 8/2021 | Jha | G08G 5/0047 |
| 2006/0291201 A1 * | 12/2006 | Smith | G02B 19/0071 362/227 |

(Continued)

*Primary Examiner* — Stephanie E Bloss
*Assistant Examiner* — Diana Hancock
(74) *Attorney, Agent, or Firm* — Li & Cai Intellectual Property Office

(57) ABSTRACT

An off-axis light-emitting device and an image capturing module using the same are provided. The off-axis light-emitting device includes a substrate, a light-emitting chip, and an optical element. The substrate has a mounting surface, and the light-emitting chip for generating a light beam has a light output surface. The light-emitting chip is disposed on the assembly surface. The optical element is disposed on the assembly surface and includes a dome portion. The dome portion is arranged in an optical path of the light beam and extends in a first direction to form an elongated shape. The dome portion has a first reference plane that passes through two opposite side surfaces of the dome portion, and the first reference plane is offset from a geometric center of the light-emitting chip in a second direction, so that the light beam passing through the dome portion forms an off-axis projection light.

15 Claims, 22 Drawing Sheets
(3 of 22 Drawing Sheet(s) Filed in Color)

(56) References Cited

U.S. PATENT DOCUMENTS

2011/0305014 A1* 12/2011 Peck .................. G02B 19/0066
29/428
2019/0144132 A1* 5/2019 Jha ........................ H05K 1/181
362/470
2022/0350074 A1* 11/2022 Yoshida ............... G02B 6/0038

* cited by examiner

OFF-AXIS LIGHT EMITTING DEVICE AND IMAGE CAPTURING MODULE USING THE SAME

CROSS-REFERENCE TO RELATED PATENT APPLICATIONS

This application claims the benefit of priority to China Patent Application No. 202210041441.0, filed on Jan. 14, 2022 in People's Republic of China. The entire content of the above identified application is incorporated herein by reference.

This application claims priority to the U.S. Provisional Patent Application Ser. No. 63/235,114 filed on Aug. 19, 2021, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a light-emitting device and an image capturing module using the same, and more particularly to an off-axis light-emitting device and an image capturing module using the same.

BACKGROUND OF THE DISCLOSURE

Since light-emitting diodes (LEDs) have advantages such as lower power consumption and a longer service life, LEDs have been widely used for illumination in recent years. Furthermore, the LEDs can be used to provide a complementary light source and is used in cooperation with a camera or an image capturing lens to enhance brightness.

A brightened area of a light source projected from a conventional LED is usually circular. Reference is made to FIG. 22, which is a far-field intensity distribution generated by a plurality of conventional LEDs. When the conventional LEDs cooperate with the camera to capture an image, a non-uniform brightness distribution of the image is captured by the camera due to the circular bright areas projected by the conventional LEDs. That is to say, in the captured image, a brightness of a central region (at which optical fields of the conventional LEDs overlap) is relatively higher, and a brightness of a corner region (at which the optical fields of the conventional LEDs do not overlap) is relatively lower. If only the brighter region that has an illuminance higher than a specific value is taken to form the image, the brightness distribution of the image can be improved, but parts of light energy generated by the conventional LEDs will be wasted and cannot be fully utilized.

However, if the LEDs are arranged to be tilted at a specific angle so as to compensate for the brightness of the optical fields, not only does the structure and circuit design become more complex, but the difficulty of relevant manufacturing processes will also be increased.

SUMMARY OF THE DISCLOSURE

In response to the above-referenced technical inadequacies, the present disclosure provides an off-axis light-emitting device and an image capturing module using the same, in which the off-axis light-emitting device can emit an off-axis projection light, so that optical energy can accumulate in a specific region. As such, a brightness distribution of an image captured by the image capturing module can be more uniform, thereby increasing a utilization rate of light energy.

In one aspect, the present disclosure provides an off-axis light-emitting device including a substrate, a light-emitting chip, and an optical element. The substrate has a mounting surface, and the light-emitting chip for generating a light beam has a light output surface. The light-emitting chip is disposed on the mounting surface. The optical element is disposed on the mounting surface and includes a dome portion. The dome portion is arranged in an optical path of the light beam and extends in a first direction to form an elongated shape. The dome portion has a first reference plane that passes through two opposite side surfaces of the dome portion, and the first reference plane is offset from a geometric center of the light-emitting chip in a second direction, so that the light beam passing through the dome portion forms an off-axis projection light.

In another aspect, the present disclosure provides an image capturing module including a circuit board, an image sensing device, and a light-emitting assembly. The image sensing device is disposed on the circuit board. The light-emitting assembly includes an on-axis light-emitting device and two off-axis light-emitting devices. The on-axis light-emitting device is disposed on the circuit board and used to generate an on-axis projection light. The two off-axis light-emitting devices are disposed on the circuit board and surround the image sensing device. The two off-axis light-emitting devices are arranged to respectively generate two off-axis projection lights having different projection directions.

Therefore, in the off-axis light-emitting device and the image capturing module using the same provided by the present disclosure, by virtue of "the dome portion being arranged in the optical path of the light beam and extending in a first direction to form an elongated shape," "the dome portion having a first reference plane that passes through two opposite side surfaces of the dome portion," "the first reference plane being offset from a geometric center of the light-emitting chip in a second direction, so that the light beam passing through the dome portion forms an off-axis projection light," and "the light-emitting assembly including an on-axis light-emitting device and two off-axis light-emitting devices, in which the two off-axis light-emitting devices surround the image sensing device and are arranged to respectively generate two off-axis projection light having different projection directions," the optical energy can be limited within a specific region. As such, a brightness distribution of an image captured by the image capturing module can be more uniform, and a utilization rate of light energy can be increased.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The patent or application file contains at least one drawing executed in color. Copies of this patent or patent application publication with color drawings will be provided by the Office upon request and payment of the necessary fee.

The described embodiments may be better understood by reference to the following description and the accompanying drawings, in which.

DETAILED DESCRIPTION OF THE EXEMPLARY EMBODIMENTS

Figure 1:
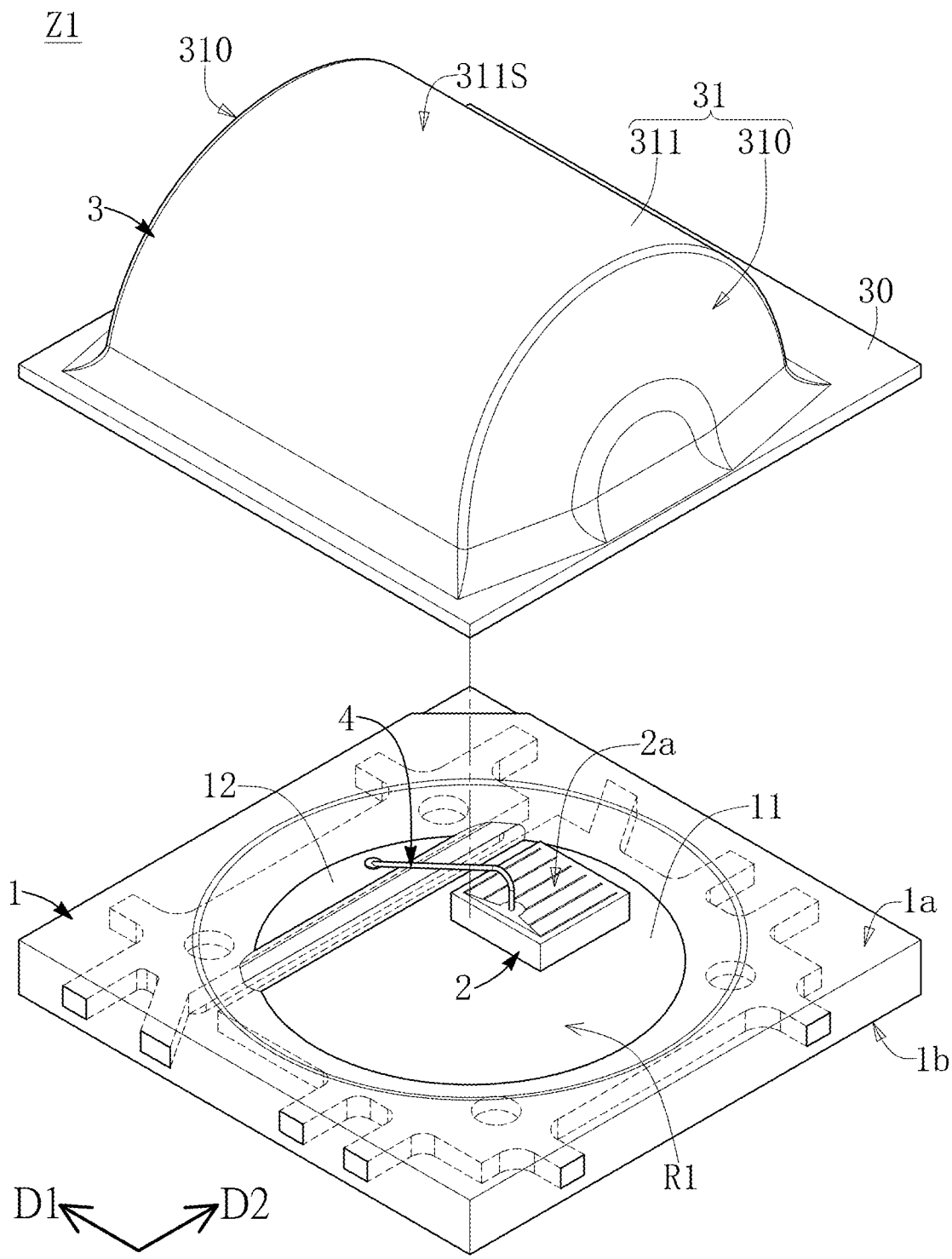
FIG. 1 is a schematic exploded view of an off-axis light-emitting device according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
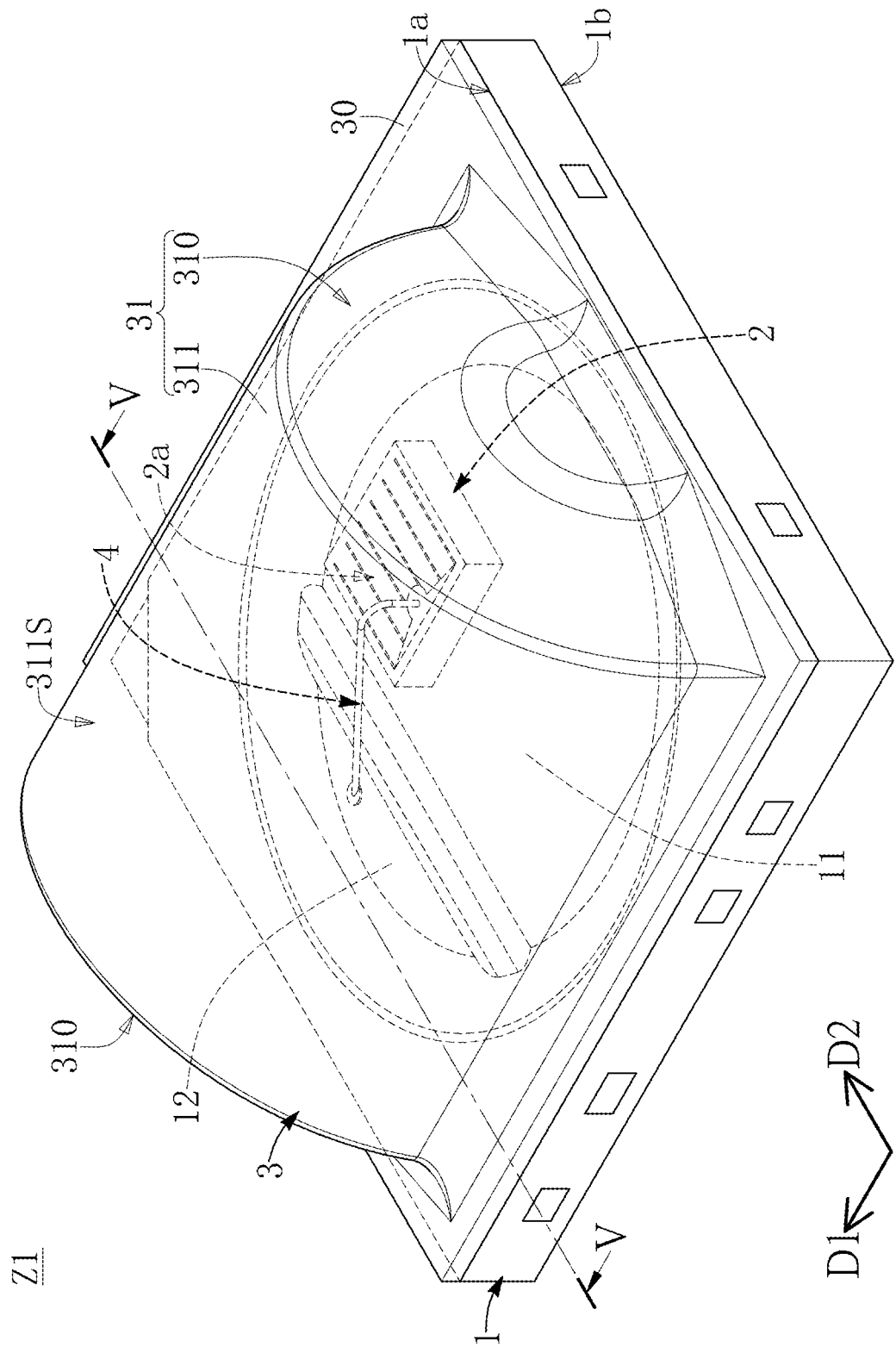
FIG. 2 is a schematic perspective view of the off-axis light-emitting device according to the embodiment of the present disclosure.
Figure 3:
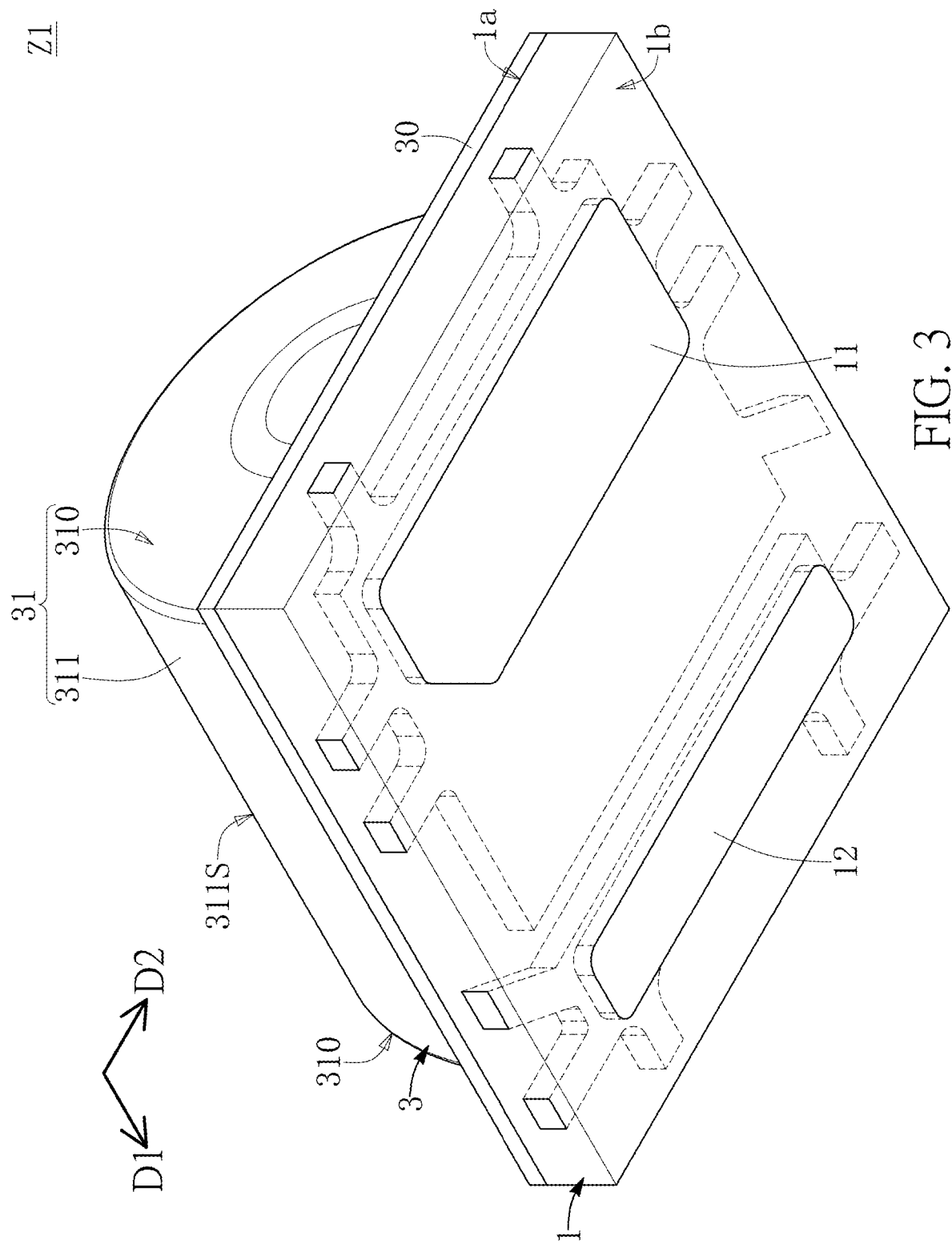
FIG. 3 is a schematic perspective view of the off-axis light-emitting device from another angle according to the embodiment of the present disclosure.

Reference is made to FIG. 1 to FIG. 3. FIG. 1 is a schematic exploded view of an off-axis light-emitting device according to an embodiment of the present disclosure. FIG. 2 and FIG. 3 are schematic perspective views of the off-axis light-emitting device respectively from different angles according to the embodiment of the present disclosure. The off-axis light-emitting device Z1 can be used to generate an asymmetrical optical field. Specifically, the off-axis light-emitting device Z1 includes a substrate 1, a light-emitting chip 2, and an optical element 3.

As shown in FIG. 1 and FIG. 2, the substrate 1 has a mounting surface 1a and a bottom surface 1b opposite to the mounting surface 1a. The substrate 1 has a chip arrangement region R1 located at the mounting surface 1a, and the chip arrangement region R1 is recessed from the mounting surface 1a, but the present disclosure is not limited thereto. In another embodiment, the chip arrangement region R1 can be a flat region.

Reference is made to FIG. 1. The substrate 1 can include a first electrode portion 11 and a second electrode portion 12. The first electrode portion 11 and the second electrode portion 12 are spaced apart from each other and are embedded in the substrate 1. Specifically, the first electrode portion 11 and the second electrode portion 12 can be separate from each other by an insulating material of the substrate 1. As shown in FIG. 1, a part of the first electrode portion 11 and a part of the second electrode portion 12 are exposed at a bottom of the chip arrangement region R1. Furthermore, as shown in FIG. 3, each of the first electrode portion 11 and the second electrode portion 12 is partially exposed at the bottom surface 1b of the substrate 1. An exposed part of each of the first and second electrode portions 11, 12 at the bottom surface 1b can serve as an electrical contact, so that the off-axis light-emitting device Z1 can be electrically connected to an external circuit (such as a circuit board).

Reference is made to FIG. 1 and FIG. 2. The light-emitting chip 2 is configured to generate a light beam and has a light output surface 2a. In the instant embodiment, the light beam generated by the light-emitting chip 2 is, for example, infrared light. Furthermore, the light-emitting chip 2 is disposed on the substrate 1 and located in the chip arrangement region R1. Specifically, the light-emitting chip 2 is arranged on the part of the first electrode portion 11 that is exposed at the chip arrangement region R1.

In the instant embodiment, the light-emitting chip 2 is a vertical light-emitting chip. That is to say, two electrodes (which are not denoted by any reference numeral) of the light-emitting chip 2 are located at the light output surface 2a and a bottom of the light-emitting chip 2, respectively. Accordingly, when the light-emitting chip 2 is arranged in the chip arrangement region R1, the light-emitting chip 2 can be electrically connected to the first electrode portion 11 through the electrode at the bottom thereof. Furthermore, another electrode of the light-emitting chip 2 can be electrically connected to the exposed part of the second electrode portion 12 at the chip arrangement region R1 through a conductive wire 4.

Reference is made to FIG. 1 and FIG. 2. The optical element 3 is disposed on the substrate 1 and covers the light-emitting chip 2. Specifically, the optical element 3 in the embodiment of the present disclosure can be a package lens which is made of an optical material, so that the light beam generated by the light-emitting chip 2 is allowed to pass. The aforementioned optical material can be, for example, poly(methyl methacrylate) (PMMA) or polycarbonate (PC). In one embodiment, the optical element 3 directly enclosing the light-emitting chip 2 and the conductive wire 4 can be formed by a molding process. As such, there is no gap between the optical element 3 and the light output surface 2a. In another embodiment, the optical element 3 can be prefabricated, and then is disposed on the substrate 1 through an optical adhesive to cover the light-emitting chip 2.

As shown in FIG. 1 and FIG. 2, the optical element 3 includes a base portion 30 and dome portion 31. In the instant embodiment, the base portion 30 completely covers the mounting surface 1a of the substrate 1, but the present disclosure is not limited thereto. In another embodiment, only a part of mounting surface 1a, such as the chip arrangement region R1, is covered by the base portion 30.

The dome portion 31 protrudes from the base portion 30 and extends in a first direction D1 to form an elongated shape. The dome portion 31 is arranged in an optical path of the light beam generated by the light-emitting chip 2. Specifically, the dome portion 31 of the instant embodiment includes two side surfaces 310 and a column body 311 that extends between the two side surfaces 310. In the instant embodiment, the column body 311 has substantially the same cross-sectional width in a second direction D2, from one of the two side surfaces 310 to the other. Furthermore, the column body 311 has a curved light emergent surface 311S. In some embodiments, a curvature radius of the curved light emergent surface 311S ranges from 0.35 mm to 2.5 mm. In one preferred embodiment, the curvature radius of the curved light emergent surface 311S in the second direction D2 is 1.37 mm.

Figure 4:
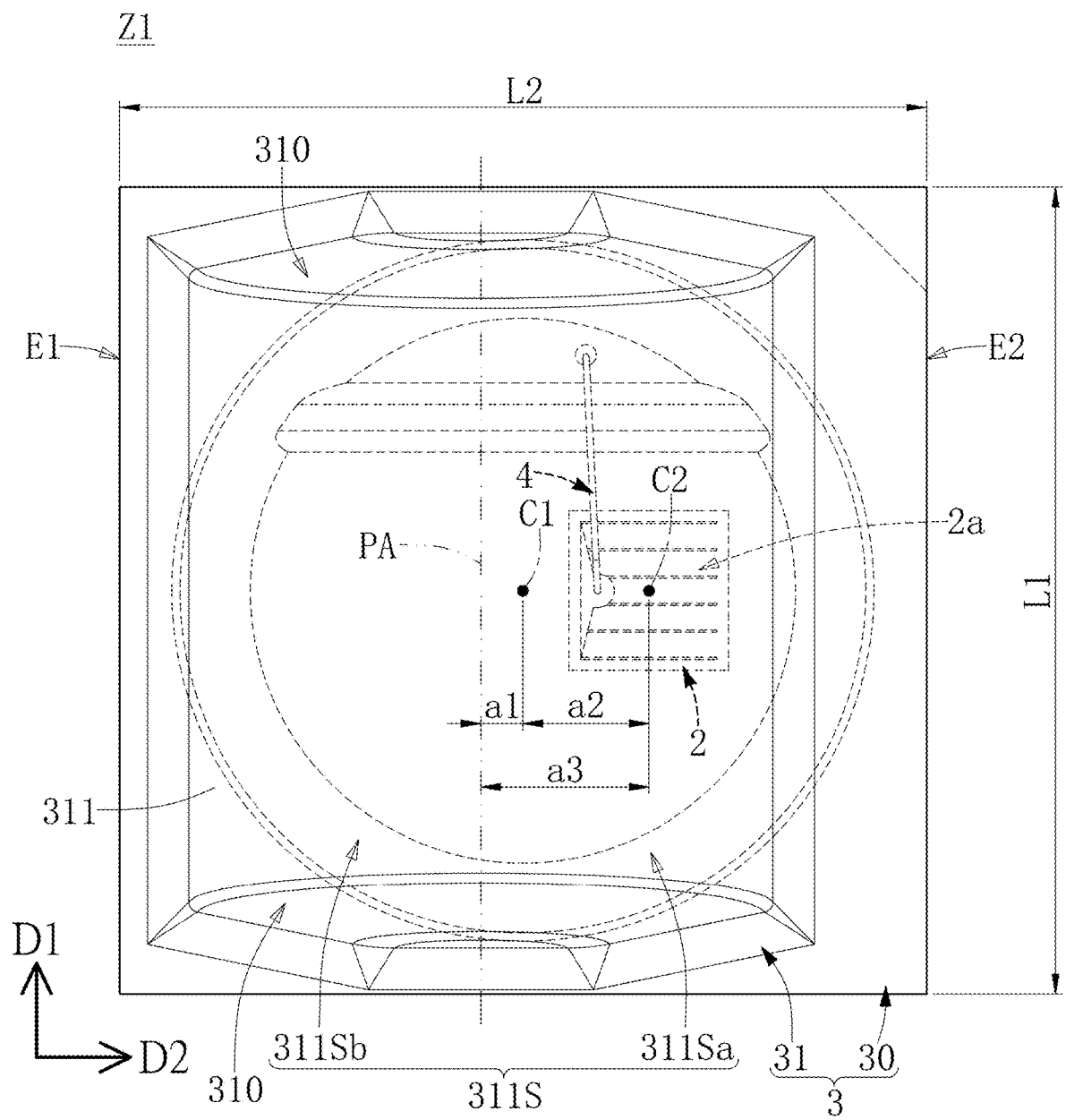
FIG. 4 is a schematic top view of the off-axis light-emitting device according to the embodiment of the present disclosure.
Figure 5:
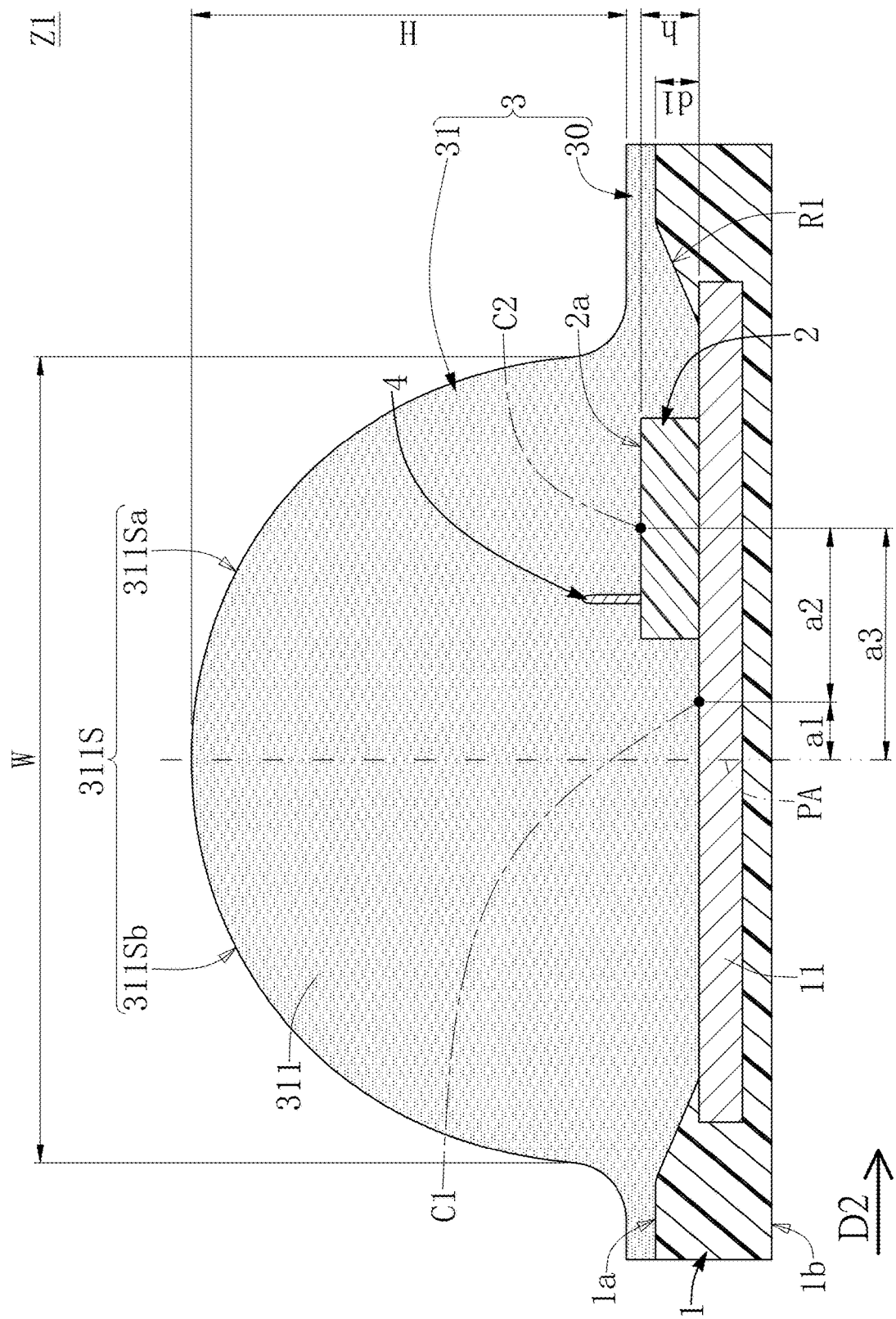
FIG. 5 is a schematic cross-sectional view taken along line V-V of FIG. 2.

Reference is made to FIG. 4 and FIG. 5, which are schematic top and cross-sectional views of the off-axis light-emitting device according to the embodiment of the present disclosure, respectively. A cross-sectional plane corresponding to a longitudinal axial centerline of the dome portion 31 is defined as a first reference plane PA. The first reference plane PA extends along the first direction D1 and passes through the two opposite side surfaces 310 of the dome portion 31, and the first reference plane PA is perpendicular to the mounting surface 1a. In the instant embodiment, the dome portion 31 has an approximately symmetrical shape with respect to the first reference plane PA.

As shown in FIG. 4, in the instant embodiment, the first reference plane PA is offset from a geometric center C2 of the light-emitting chip 2 in the second direction D2 so that the light beam passing through the dome portion 31 forms an off-axis projection light. That is to say, by arranging the first reference plane PA of the dome portion 31 to be offset from the geometric center C2 of the light-emitting chip 2, a major part of the light beam generated by the light-emitting chip 2 and passing through the curved light emergent surface 311S is guided to one side of the first reference plane PA and deviates from an optical axis of the optical element 3.

Specifically, the first reference plane PA of the dome portion 31 is offset from the geometric center C2 of the light-emitting chip 2 in the second direction D2 by a relative offset distance a3. It should be noted that, in the instant embodiment, the mounting surface 1a of the substrate 1 has a first length L1 in the first direction D1, and a second length L2 in the second direction D2. In one embodiment, a ratio of the relative offset distance a3 to the second length L2 is less than 0.6, but cannot be equal to zero, so as to attenuate stray light in an optical-field distribution of the off-axis projection light. Furthermore, referring to FIG. 5, the dome portion 31 has a width W in the second direction D2. In some embodiments, a ratio of the relative offset distance a3 to the width W of the dome portion 31 in the second direction D2 is less than 0.8, but cannot be equal to zero.

Reference is further made to FIG. 4. In the instant embodiment, the first reference plane PA can be offset from a geometric center C1 of the mounting surface 1a in the second direction D2. That is to say, the first reference plane PA of the dome portion 31 is not aligned to the geometric center C1 of the mounting surface 1a, but the present disclosure is not limited thereto. Accordingly, in one embodiment, the first reference plane PA is offset from the geometric center C1 of the mounting surface 1a in the second direction D2 by a first offset distance a1, and a ratio of the first offset distance a1 to the second length L2 ranges from 0 to 0.3.

Furthermore, in the instant embodiment, the light-emitting chip 2 can be offset from the geometric center C1 of the mounting surface 1a. In other words, the light-emitting chip 2 can be disposed on the substrate 1 without being in alignment with a center of the substrate 1, such that the geometric center C2 of the light-emitting chip 2 is offset from the geometric center C1 of the mounting surface 1a in the second direction D2, but the present disclosure is not limited thereto. In one embodiment, the geometric center C2 of the light-emitting chip 2 is offset from the geometric center C1 of the mounting surface 1a in the second direction D2 by a second offset distance a2, and a ratio of the second offset distance a2 to the second length L2 ranges from 0 to 0.3.

Accordingly, in the present disclosure, the geometric center C2 of the light-emitting chip 2 and the first reference plane PA of the dome portion 31 are not in alignment with each other so that the light beam emitting out of the dome portion 31 deviates from the optical axis thereof. However, only one of the geometric center C2 (of the light-emitting chip 2) and the first reference plane PA is offset from the geometric center C1 of the mounting surface 1a, and the other one is in alignment with the geometric center C1 of the mounting surface 1a.

In the embodiment shown in FIG. 4, both of the light-emitting chip 2 and the dome portion 31 are offset from the geometric center C1 of the mounting surface 1a. However, the light-emitting chip 2 and the dome portion 31 are respectively offset from the geometric center C1 of the mounting surface 1a toward two opposite directions. As such, even if a size of the substrate 1 is not increased, the relative offset distance a3 is large enough to satisfy the requirements for generating the off-axis projection light.

To be more specific, the mounting surface 1a has a first side edge E1 and a second side edge E2 that extend along the first direction D1 and are respectively located at two opposite sides of the substrate 1. In the instant embodiment, the first reference plane PA is closer to the first side edge E1 and farther away from the second side edge E2. Accordingly, the first offset distance a1 between the first reference plane PA and the geometric center C1 of the mounting surface 1a in the second direction D2 is less than the relative offset distance a3.

Furthermore, as shown in FIG. 4, the curved light emergent surface 311S of the dome portion 31 can be divided into a first region 311Sa and a second region 311Sb by the first reference plane PA, and the light-emitting chip 2 is located under the first region 311Sa. That is to say, an orthographic projection of the first region 311Sa on the mounting surface 1a overlaps with the light-emitting chip 2, and an orthographic projection of the second region 311Sb on the mounting surface 1a does not overlap with the light-emitting chip 2.

However, in another embodiment, when the geometric center C2 of the light-emitting chip 2 is in alignment with the geometric center C1 of the mounting surface 1a, but offsets from the first reference plane PA of the dome portion 31, the orthographic projection of the second region 311Sb on the mounting surface 1a can partially overlap with the light-emitting chip 2. Accordingly, the orthographic projection of the second region 311Sb of the curved light emergent surface 311S on the mounting surface 1a only partially overlaps with the light-emitting chip 2, or does not overlap with the light-emitting chip 2.

Furthermore, as shown in FIG. 5, the dome portion 31 has a height H relative to the base portion 30, and a ratio of the height H to the width W of the dome portion 31 in the second direction D2 would affect a light pattern generated by the off-axis light-emitting device Z1. In one embodiment, a height to width ratio is 1:1 to 1:3, and is preferably 1:2. That is to say, the ratio of the height H of the dome portion 31 to the width W of the dome portion 31 in the second direction D2 can range from 0.3 to 1. When the ratio of the height H to the width W is too large (i.e., H>W), the curvature radius of the curved light emergent surface 311S in the second direction D2 becomes smaller, which causes a light pattern generated by the off-axis light-emitting device Z1 to be too convergent. Furthermore, when the ratio of the height H to the width W is too small, the curvature radius of the curved light emergent surface 311S in the second direction D2 becomes larger, which causes a light pattern generated by the off-axis light-emitting device Z1 to be too divergent.

As shown in FIG. 5, in the instant embodiment, the chip arrangement region R1 has a depth d1 that is less than or equal to a height (h) of the light-emitting chip 2, so as to prevent the optical path of the light beam generated by the light-emitting chip 2 from being affected and prevent an increase in stray light.

Figure 6:
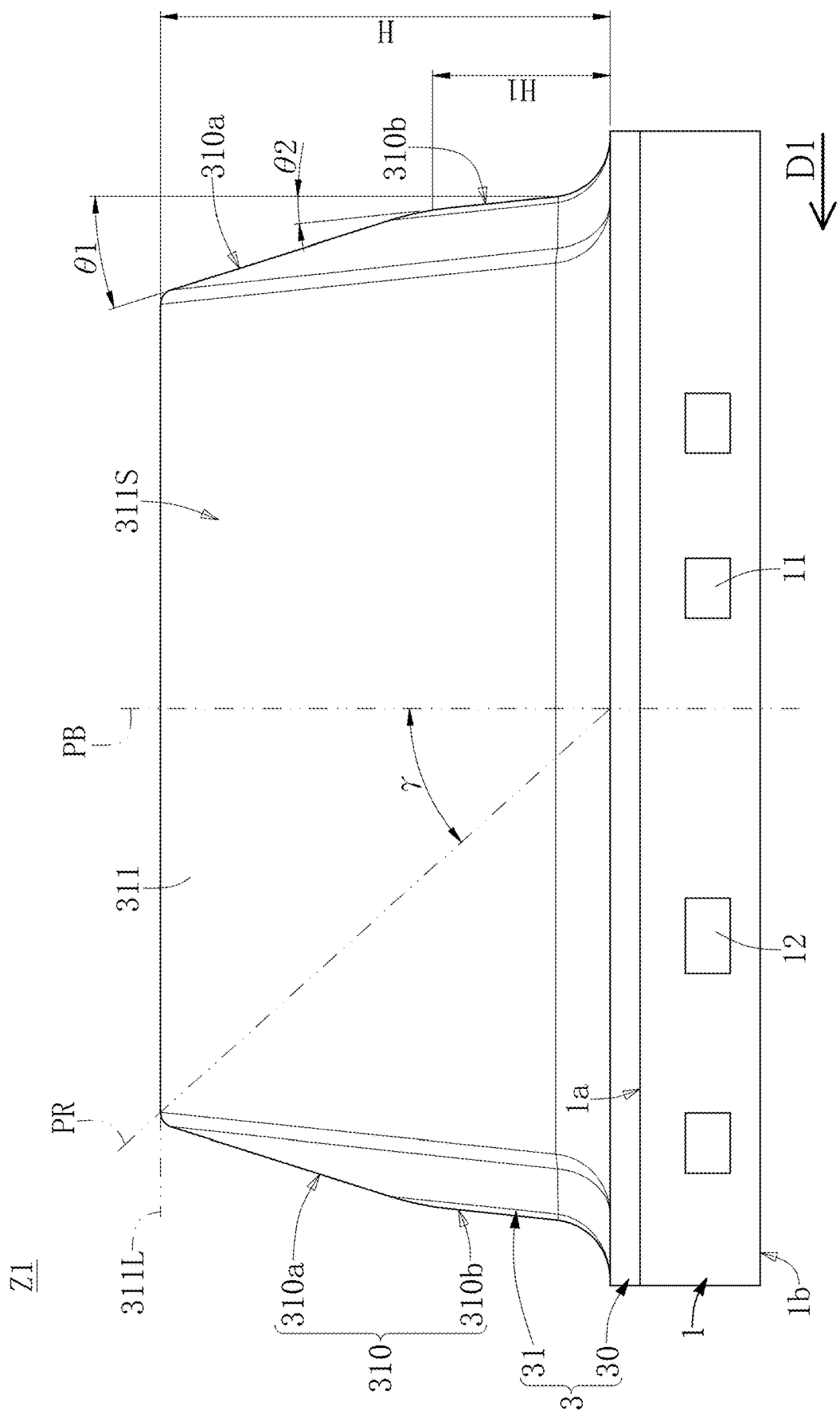
FIG. 6 is a schematic side view of the off-axis light-emitting device according to the embodiment of the present disclosure.

Reference is made to FIG. 6, which is a schematic side view of the off-axis light-emitting device according to the embodiment of the present disclosure. A cross-sectional plane which traverses across the column body 311 of the dome 31 is defined as a second reference plane PB, and the second reference plane PB does not pass through the two side surfaces 310 of the dome portion 31. Specifically, the second reference plane PB is parallel to a plane defined by the second direction D2 and a height direction of the dome portion 31. In the instant embodiment, the dome portion 31 has an approximately symmetrical shape with respect to the second reference plane PB.

The curved light emergent surface 311S has a topmost axial line 311L that passes through a top end of the curved light emergent surface 311S, and the topmost axial line 311L extends along the first direction D1. Furthermore, a curvature radius of the topmost axial line 311L in the first direction D1 is greater than 10 mm, and can be infinitely large. That is to say, the topmost axial line 311L can be a straight line. When the topmost axial line 311L of the curved light emergent surface 311S has the curvature radius greater than 10 mm, or when the topmost axial line 311L is a straight line, it can be observed in a direction toward the first reference plane PA that after passing through the topmost axial line 311L, the light beam generated by the light-emitting chip 2 is not guided toward the second reference plane PB and is not converged. Accordingly, the optical field of the off-axis projection light can be expanded in the first direction D1.

Furthermore, a plane passing through a top end of one of the side surfaces 310 and the geometric center C1 of the mounting surface 1a is defined as a reference plane PR. It is worth mentioning that the reference plane PR and the second reference plane PB form an angle γ therebetween, and the angle γ is less than a total internal reflection critical angle for the light beam in the dome portion 31, so as to reduce total internal reflection of the light beam generated by the light-emitting chip 2 in the dome portion 31 and prevent luminous intensity from being decreased. For example, when the dome portion 31 is made of a material with a refractive index of 1.54, and a critical angle for the total internal reflection of the light beam in the dome portion 31 is 40.5 degrees, the angle γ between the reference plane PR and the second reference plane PB is less than 40.5 degrees so as to prevent the decrease of the luminous intensity, but the present disclosure is not limited thereto. In another embodiment, when the material of the dome portion 31 is changed to have a different refractive index, the angle γ between the reference plane PR and the second reference plane PB is adjusted accordingly.

Furthermore, referring to FIG. 6, in the instant embodiment, each of the side surfaces 310 of the dome portion 31 includes a first inclined part 310a and a second inclined part 310b, and the first inclined part 310a surrounds the second inclined part 310b. Specifically, the first inclined part 310a is connected between the curved light emergent surface 311S and the second inclined part 310b. The first inclined part 310a is tilted at a first acute angle θ1 relative to a vertical reference plane. The aforementioned vertical reference plane extends in the second direction D2 and is perpendicular to the substrate 1. Furthermore, the second inclined part 310*b* is tilted at a second acute angle θ2 relative to the vertical reference plane, and the first acute angle θ1 is greater than the second acute angle θ2.

Specifically, in the embodiment of the present disclosure, the side surfaces 310 of the dome portion 31 can assist in adjusting the light pattern. When a portion of the light beam generated by the light-emitting chip 2 passes through and emits out of the first inclined part 310*a*, the portion of the light beam can be deviated toward a specific range. In other words, the portions of light beam passing through the two opposite side surfaces 310 can be guided toward a specific region as much as possible, thereby attenuating the generation of stray light.

The first acute angle θ1 can range from 0 to 20 degrees, which can be adjusted according to the size of the light-emitting chip 2. The second acute angle θ2 can range from 0 to 8 degrees, which allows a length of the dome portion 31 in the first direction D1 to be reduced, thereby reducing the entire size of the off-axis light-emitting device Z1 as much as possible. In the instant embodiment, a highest point of the second inclined part 310*b* has a height H1 relative to the base portion 30, and the height H1 is 0.3 to 0.5 times the height H of the dome portion 31. Accordingly, the portion of the light beam travelling toward each of the side surfaces 310 mainly emits from the first inclined part 310*a*, thereby improving an effect of light convergence.

Figure 7:
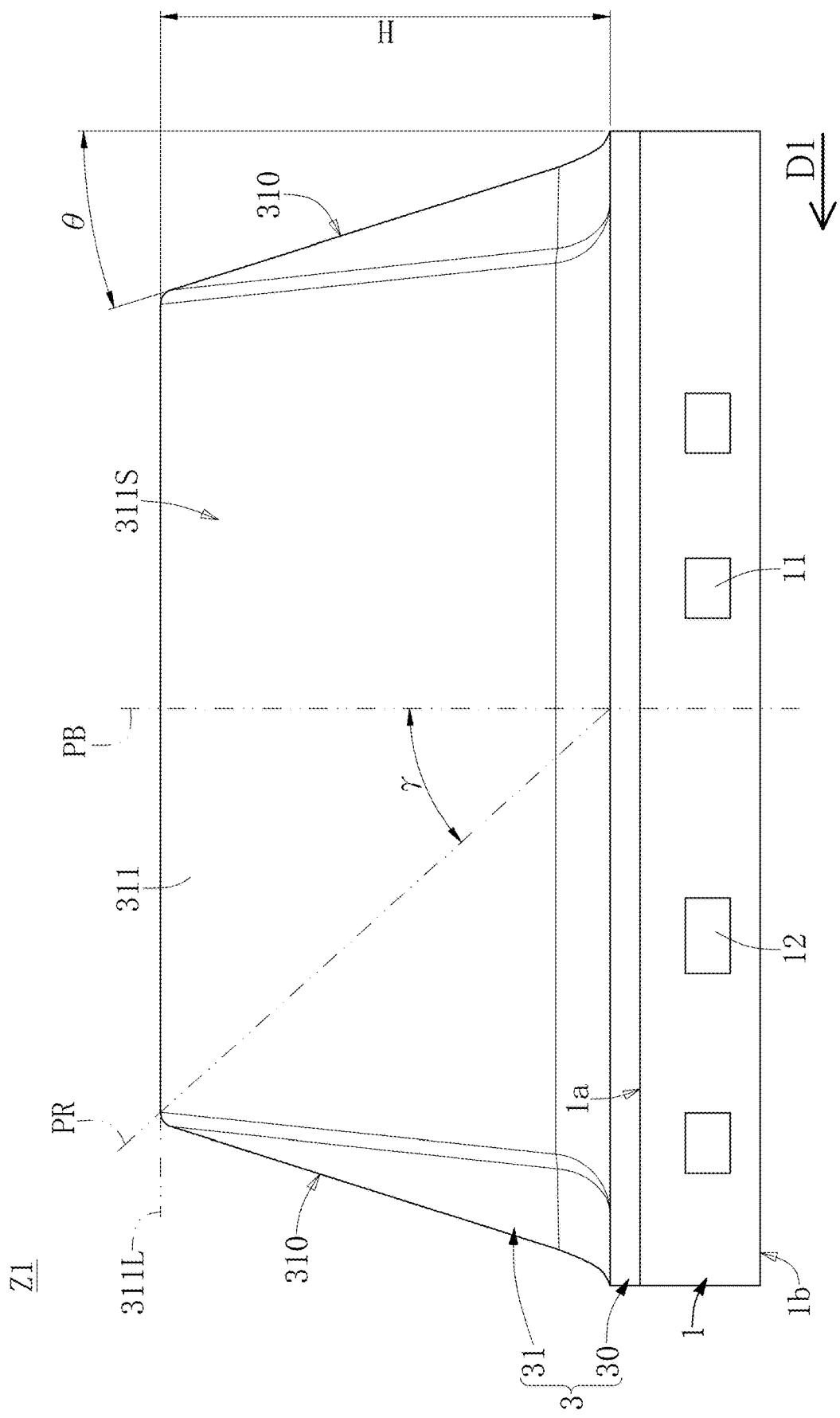
FIG. 7 is a partial schematic side view of an off-axis light-emitting device according to another embodiment of the present disclosure.

However, the present disclosure is not limited to the abovementioned example. If downsizing of the off-axis light-emitting device Z1 is not considered, each of the side surfaces 310 of the dome portion 31 can include only one inclined part. Referring to FIG. 7, in the instant embodiment, the inclined part and the vertical reference plane form an acute angle θ, and a range of the acute angle θ can be the same as that of the first acute angle θ1, i.e., the acute angle θ ranges from 0 to 20 degrees. As such, the effects of converging light and attenuating stray light can also be achieved.

Figure 8:
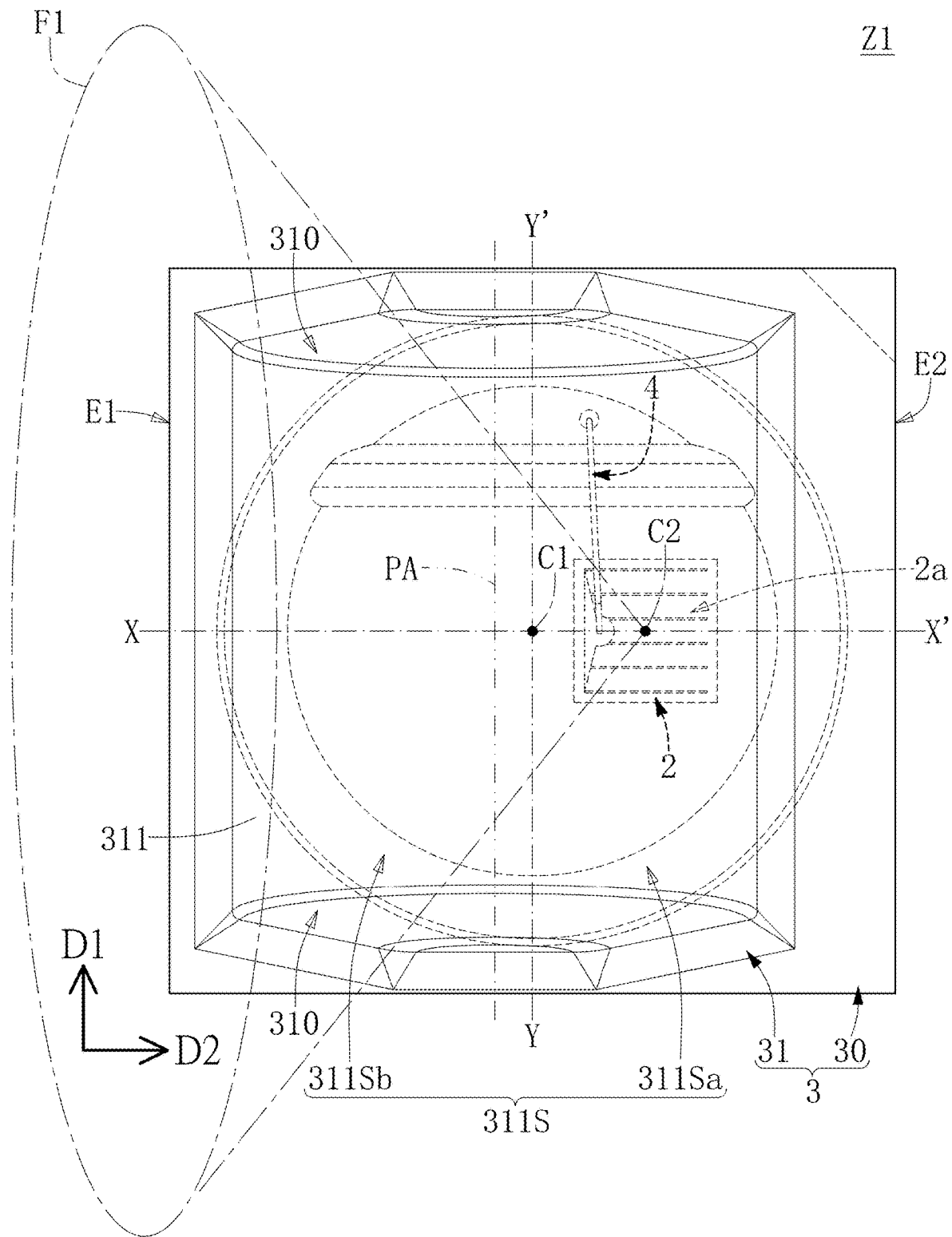
FIG. 8 is a schematic top view of the off-axis light-emitting device with projection light according to the embodiment of the present disclosure.
Figure 9:
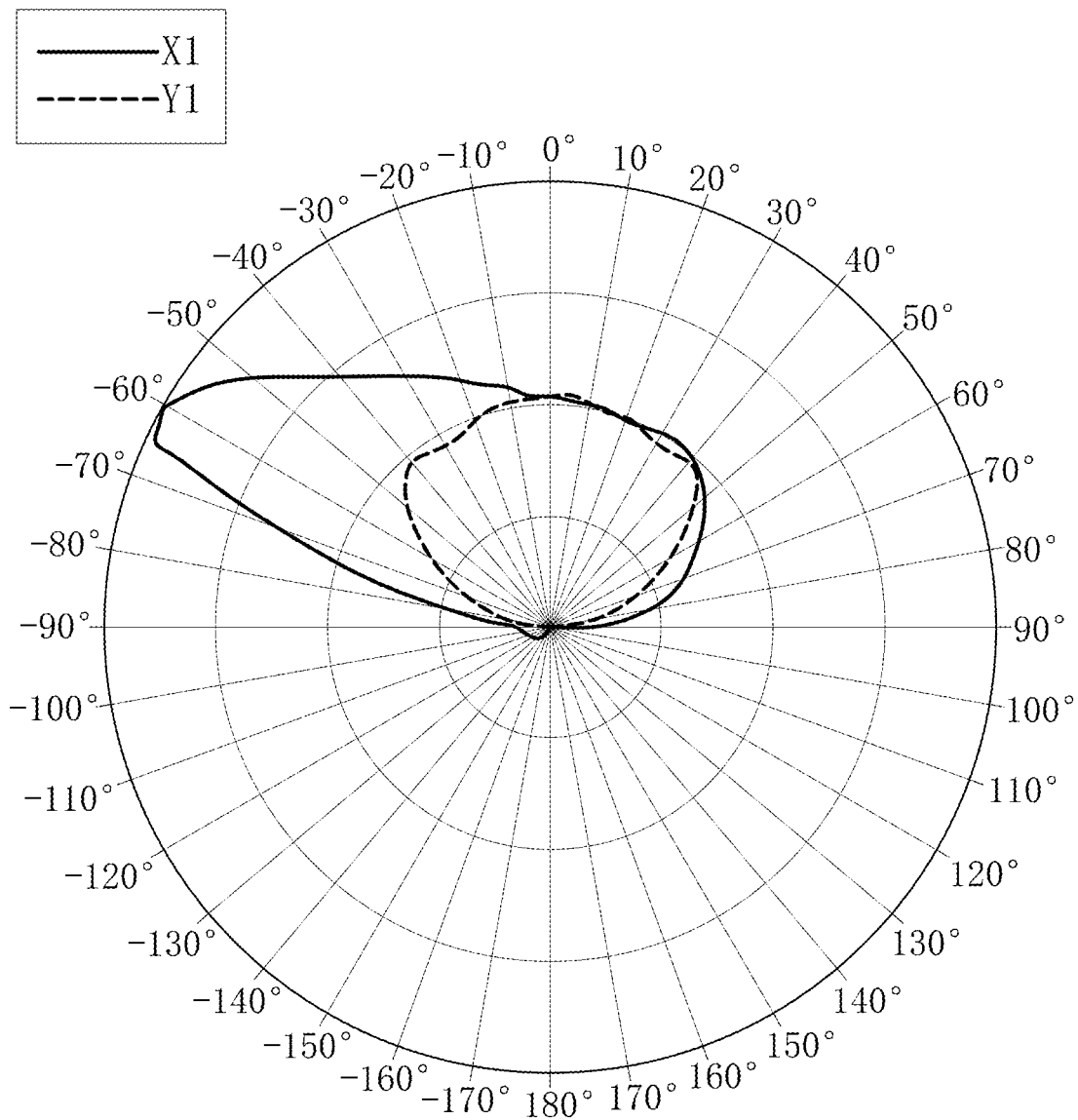
FIG. 9 is a luminous intensity distribution diagram of the off-axis light-emitting device according to the embodiment of the present disclosure.
Figure 10:
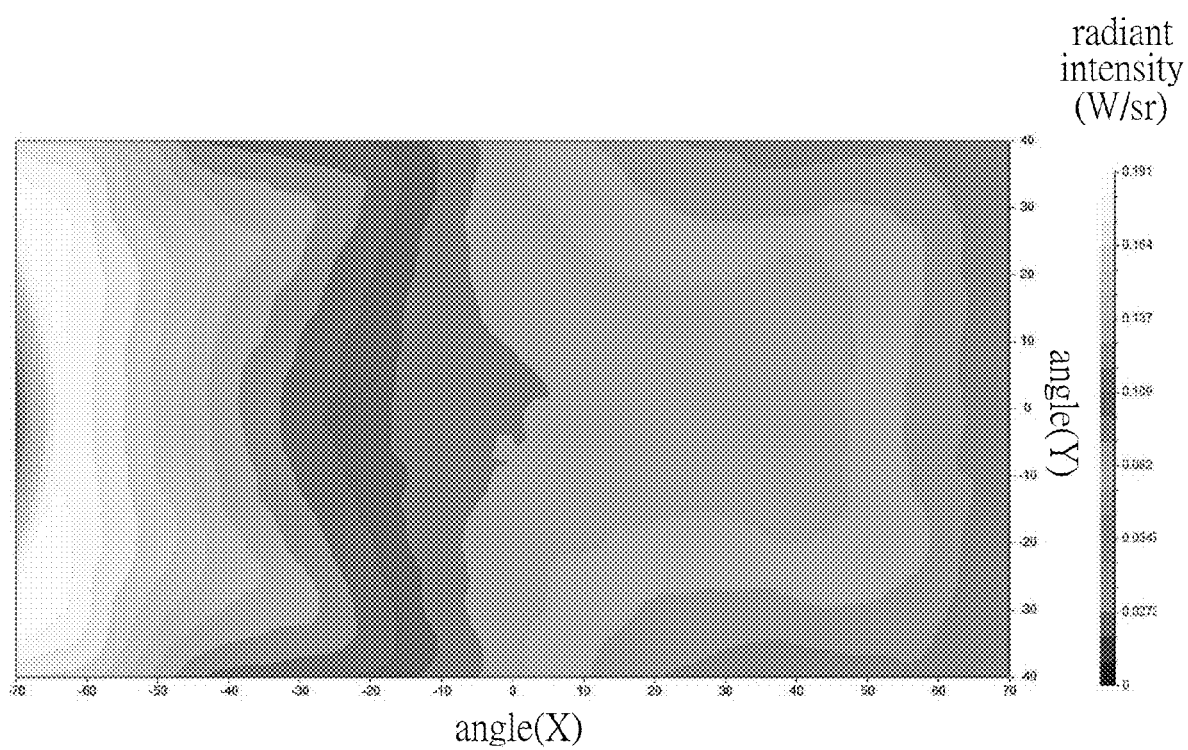
FIG. 10 is a far-field intensity distribution generated by the off-axis light-emitting device according to the embodiment of the present disclosure.

Reference is made to FIG. 8 to FIG. 10. FIG. 8 is a schematic top view of the off-axis light-emitting device when projection light according to the embodiment of the present disclosure; FIG. 9 is a luminous intensity distribution diagram of the off-axis light-emitting device according to the embodiment of the present disclosure; and FIG. 10 is a far-field intensity distribution generated by the off-axis light-emitting device according to the embodiment of the present disclosure. By arranging the first reference plane PA of the dome portion 31 to be offset from the geometric center C2 of the light-emitting chip 2, the off-axis projection light F1 generated by the off-axis light-emitting device Z1 provided in the embodiment of the present disclosure deviates from the first reference plane PA, and is projected toward a side of the first reference plane PA.

Specifically, as shown in FIG. 8, the light beam generated by the light-emitting chip 2 mainly emits from the second region 311Sb of the curved light emergent surface 311S. Referring to FIG. 9, a normal axis that is perpendicular to the mounting surface 1*a* and passes through the geometric center C1 is defined. A curve X1 represents radiant intensities that are respectively measured at different normal angles from the normal axis to a line X-X', and the curve Y1 represents different radiant intensities that are respectively measured at different angles from the normal axis to a line Y-Y'. Each of the radiant intensities shown in FIG. 9 has been normalized. In the instant embodiment, the normal axis is defined as 0 degrees, any one of normal angles within a range from the normal axis to a line C1-X' is defined as a positive angle in the second direction D2, and any one of normal angles within a range defined between the normal axis and a line C1-X is defined as a negative angle in the second direction D2. Similarly, any one of normal angles within a range defined between the normal axis and a line C1-Y' is defined as a positive angle in the first direction D1, and any one of normal angles within a range defined between the normal axis and a line C1-Y is defined as a negative angle in the first direction D1.

According to the curve X1 shown in FIG. 9, the radiant intensity that is measured within a region located above the second region 311Sb of the curved light emergent surface 311S is relatively greater, and the region corresponds to a range of a normal angle from −50 degrees to −70 degrees relative to the normal axis. The radiant intensity that is measured within a region located above the first region 311Sa of the curved light emergent surface 311S is not more than 50% of the largest radiant intensity, and the region corresponds to a range of a normal angle from +20 degrees to +60 degrees relative to the normal axis.

According to the curve Y1 shown in FIG. 9, an optical energy distribution is relatively symmetrical between the normal axis and the line Y-Y'. However, since the off-axis projection light F1 is mainly projected above the second region 311Sb, only the radiant intensities measured at the positions corresponding to a normal angle of −40 degrees to +40 degrees are relatively greater.

Reference is made to FIG. 10. The off-axis projection light F1 projected onto a reference plane forms an asymmetrical optical field distribution region thereon. The reference plane is parallel to the mounting surface 1*a* and spaced apart from the off-axis light-emitting device Z1 by a predetermined distance. As shown in FIG. 10, a vertical axis represents the normal angle with respect to the normal axis in a direction (the first direction D1) parallel to the line Y-Y', and a horizontal axis represents the normal angle with respect to the normal axis in a direction (the second direction D2) parallel to the line X-X'. The asymmetrical optical field distribution region shown in FIG. 10 covers a range of 140*80 degrees. In the asymmetrical optical field distribution region, the radiant intensities that are greater than 50% of the largest radiant intensity are accumulated at a peripheral region that is closer to one side of the reference plane and farther away from a central region of the reference plane. As shown in FIG. 10, in the instant embodiment, the radiant intensity of the asymmetrical optical field distribution region gradually increases from one side to the other side of the reference plane (i.e., along a direction from X' to X).

As mentioned above, the off-axis light-emitting device Z1 provided in the embodiment of the present disclosure can generate the asymmetrical optical field distribution region, and is applicable in certain industries. Furthermore, referring to FIG. 9 and FIG. 10, no excessive stray light is produced in the asymmetrical optical field distribution region generated by the off-axis light-emitting device Z1 in the embodiment of the present disclosure.

Figure 11:
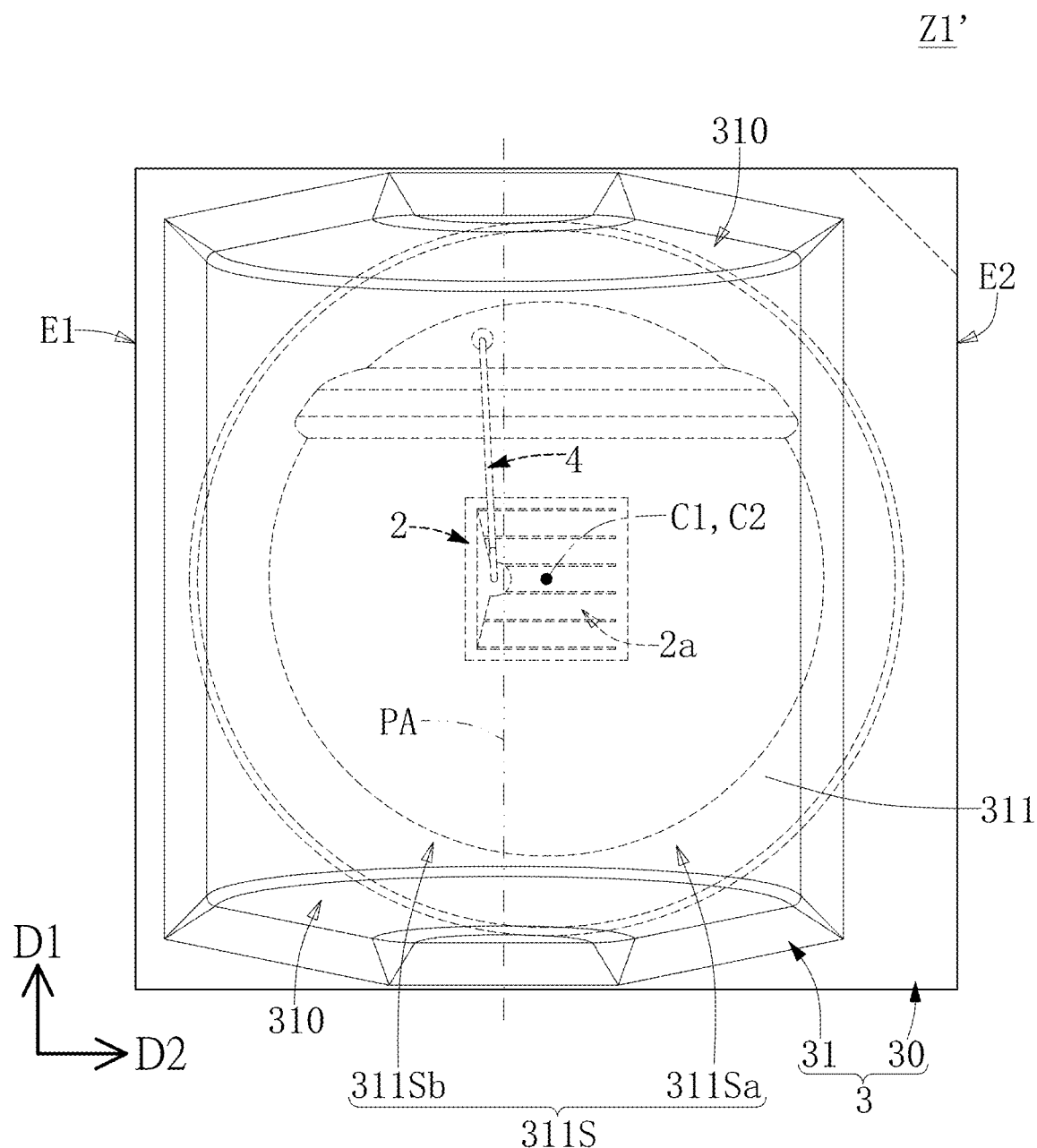
FIG. 11 is a schematic top view of an off-axis light-emitting device with projection light according to yet another embodiment of the present disclosure.

Reference is made to FIG. 11, which is a schematic top view of the off-axis light-emitting device with projection light according to yet another embodiment of the present disclosure. Elements in the instant embodiment that are the same as or similar to those in the previous embodiments are denoted by the same or similar reference numerals, and will not be reiterated herein. In the off-axis light-emitting device Z1' of the instant embodiment, the first reference plane PA is offset from the geometric center C2 of the light-emitting chip 2 in the second direction D2. However, in the instant embodiment, the geometric center C2 of the light-emitting chip 2 is in alignment with the geometric center C1 of the mounting surface 1a. In the instant embodiment, an orthographic projection of the second region 311Sb of the curved light emergent surface 311S on the mounting surface 1a partially overlaps with the light-emitting chip 2. However, an overlapping area between the orthographic projection of the second region 311Sb on the mounting surface 1a and the light-emitting chip 2 is less than an overlapping area between the orthographic projection of the first region 311Sa on the mounting surface 1a and the light-emitting chip 2.

Figure 12:
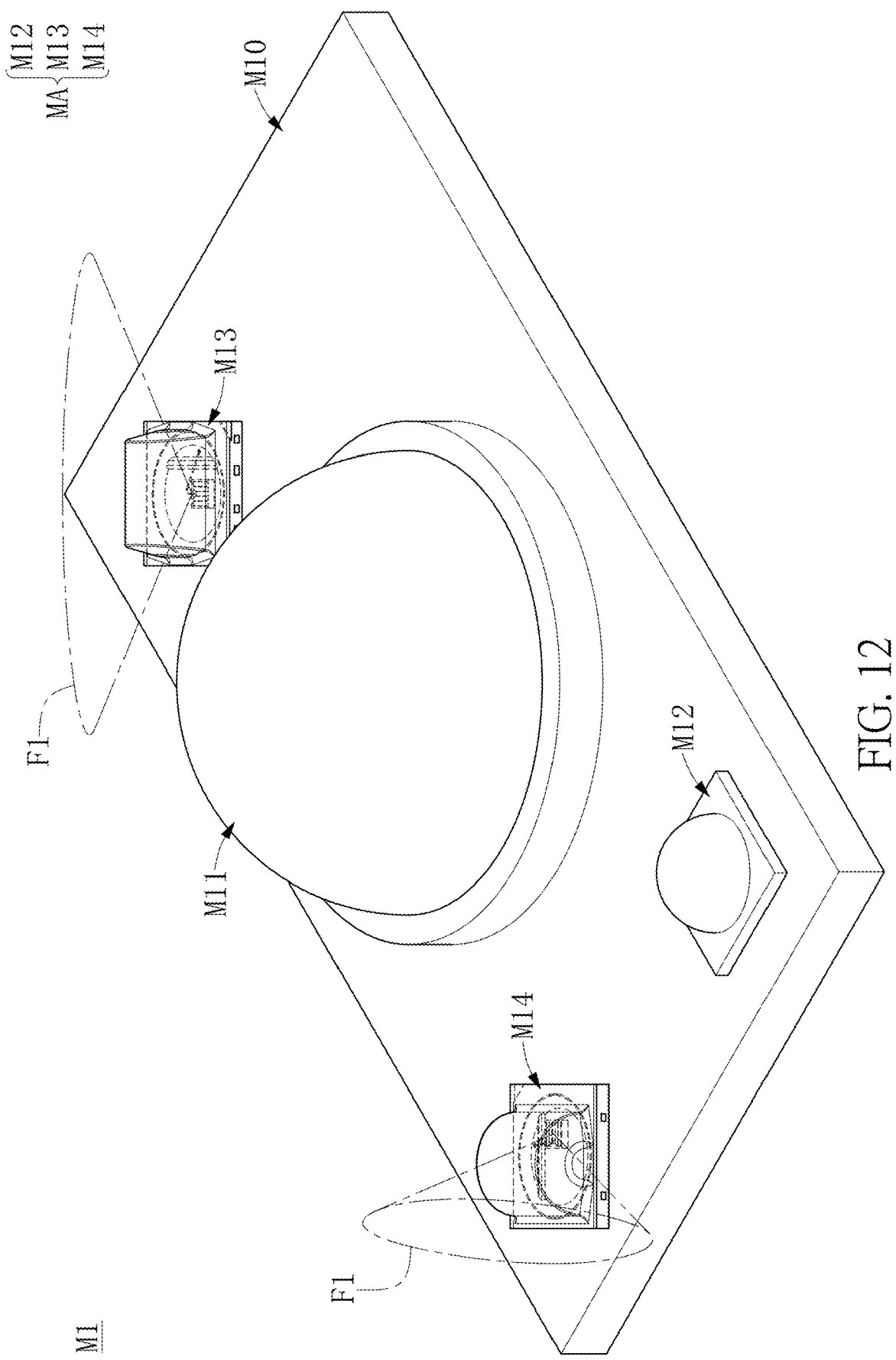
FIG. 12 is a schematic perspective view of an image capturing module according to a first embodiment of the present disclosure.

Reference is made to FIG. 12, which is a schematic perspective view of an image capturing module according to a first embodiment of the present disclosure. An image capturing module M1 includes a circuit board M10, an image sensing device M11, and a light-emitting assembly MA.

The image sensing device M11 is, for example, a camera lens, which may include a lens, a printed circuit board, a fixing element, a filter, a sensor, and a digital processor, and so on.

The light-emitting assembly MA is arranged on the circuit board M10 to cooperate with the image sensing device M11. Specifically, the light-emitting assembly MA can include at least one on-axis light-emitting device M12 and at least two off-axis light-emitting devices M13, M14.

The on-axis light-emitting device M12 is used to generate an on-axis projection light. Each of the off-axis light-emitting devices M13, M14 can be any one of the off-axis light-emitting devices Z1, Z1' that are respectively shown in FIG. 2 and FIG. 11 to generate an off-axis projection light F1. In the instant embodiment, each of the off-axis light-emitting devices M13, M14 has the same structure as that of the off-axis light-emitting device Z1 shown in FIG. 2, and will not be reiterated herein.

In the instant embodiment, for example, all of the on-axis projection light and the two off-axis projection lights F1 are infrared light. The on-axis light-emitting device M12 and the off-axis light-emitting devices M13, M14 can be arranged to surround the image sensing device M11. It is worth mentioning that the off-axis light-emitting devices M13, M14 are arranged to generate two off-axis projection lights F1 that have different projection directions A1, A2, respectively.

Figure 13:
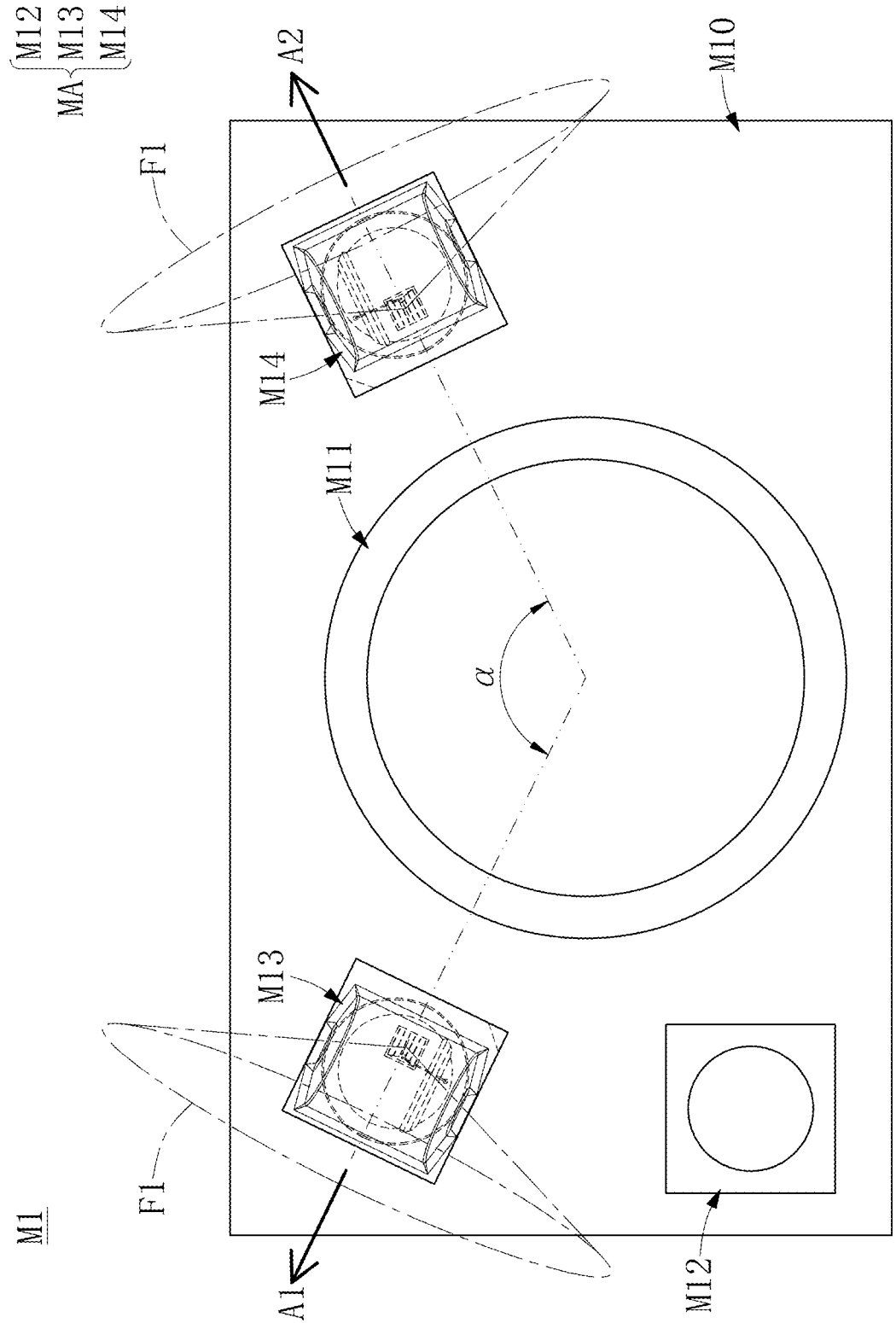
FIG. 13 is a schematic top view of the image capturing module according to the first embodiment of the present disclosure.

Specifically, referring to FIG. 13, FIG. 13 is a schematic top view of the image capturing module according to the first embodiment of the present disclosure. The projection direction A1 of the off-axis projection light F1 generated by one of the off-axis light-emitting devices M13, M14 is different from the projection direction A2 of the off-axis projection light F1 generated by another one of the off-axis light-emitting devices M13, M14. Moreover, the projection directions A1, A2 form an angle α therebetween, and the angle α can be adjusted according to a quantity of the off-axis light-emitting devices and light patterns from practical requirements.

By arranging the two off-axis light-emitting devices M13, M14 to generate two off-axis projection lights F1 that respectively have different projection directions A1, A2, and are in cooperation with the on-axis projection light F2 generated by the on-axis light emitting device M12, a uniformity of a far-field light distribution can be improved. Accordingly, when the light-emitting assembly MA cooperates with the image sensing device M11 to capture an image, a non-uniform distribution of light intensity of the captured image can be prevented. That is to say, the two off-axis projection lights F1 generated by the two off-axis light-emitting devices M13, M14 can be used to compensate for the lack of brightness of a region that cannot be illuminated by the on-axis projection light. As such, not only can the brightness uniformity of the image be improved, but a utilization rate of light energy of the light-emitting assembly MA can also be increased.

Figure 14:
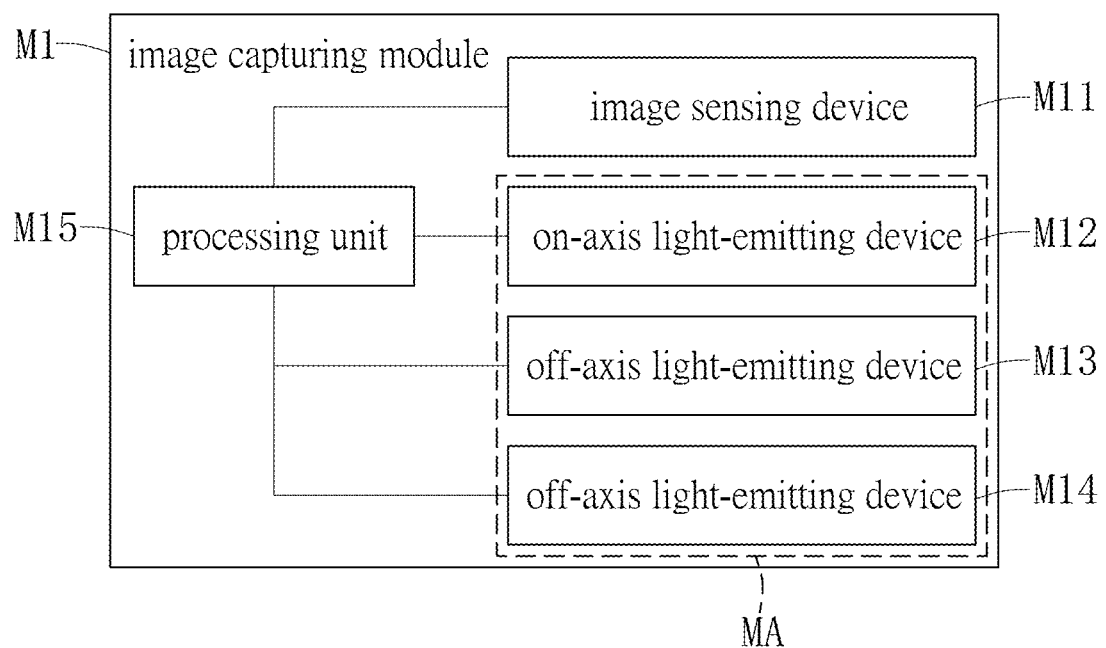
FIG. 14 is a functional block diagram of an image capturing module according to one embodiment of the present disclosure.

Reference is made to FIG. 14, which is a functional block diagram of an image capturing module according to an embodiment of the present disclosure. The image capturing module M1 can further include a processing unit M15 that is electrically connected to the image sensing device M11 and the light-emitting assembly MA. It should be noted that a circuit layout has been configured in the circuit board M10, so that each of the elements disposed on the circuit board M10 can be electrically connected to the processing unit M15.

The image captured by the image sensing device M11 can be transmitted to the processing unit M15 to be processed and then outputted. Furthermore, the processing unit M15 is electrically connected to the on-axis light emitting device M12 and the two off-axis light-emitting devices M13, M14 so as to individually control the on-axis light emitting device M12 and the two off-axis light-emitting devices M13, M14 to turn on and off. Accordingly, the light pattern of the light source generated by the light-emitting assembly MA can be adjusted and controlled depending on particular implementations.

For example, when the off-axis light-emitting devices M13, M14 and the on-axis light emitting device M12 are turned on, the light source generated by the light-emitting assembly MA is projected onto a reference plane and then forms an optical field with uniform distribution. Furthermore, when the on-axis light emitting device M12 and the off-axis light-emitting device M13 are turned off, and only the off-axis light-emitting device M14 is turned on by the processing unit M15, the light source generated by the light-emitting assembly MA is projected onto a reference plane so that only a region corresponding to a projection range of the off-axis projection light F1 is relatively brighter. Accordingly, the above configuration allows only a portion of light-emitting devices to be turned on in the light-emitting assembly MA for illuminating a specific region, such that the energy can be saved.

Figure 15:
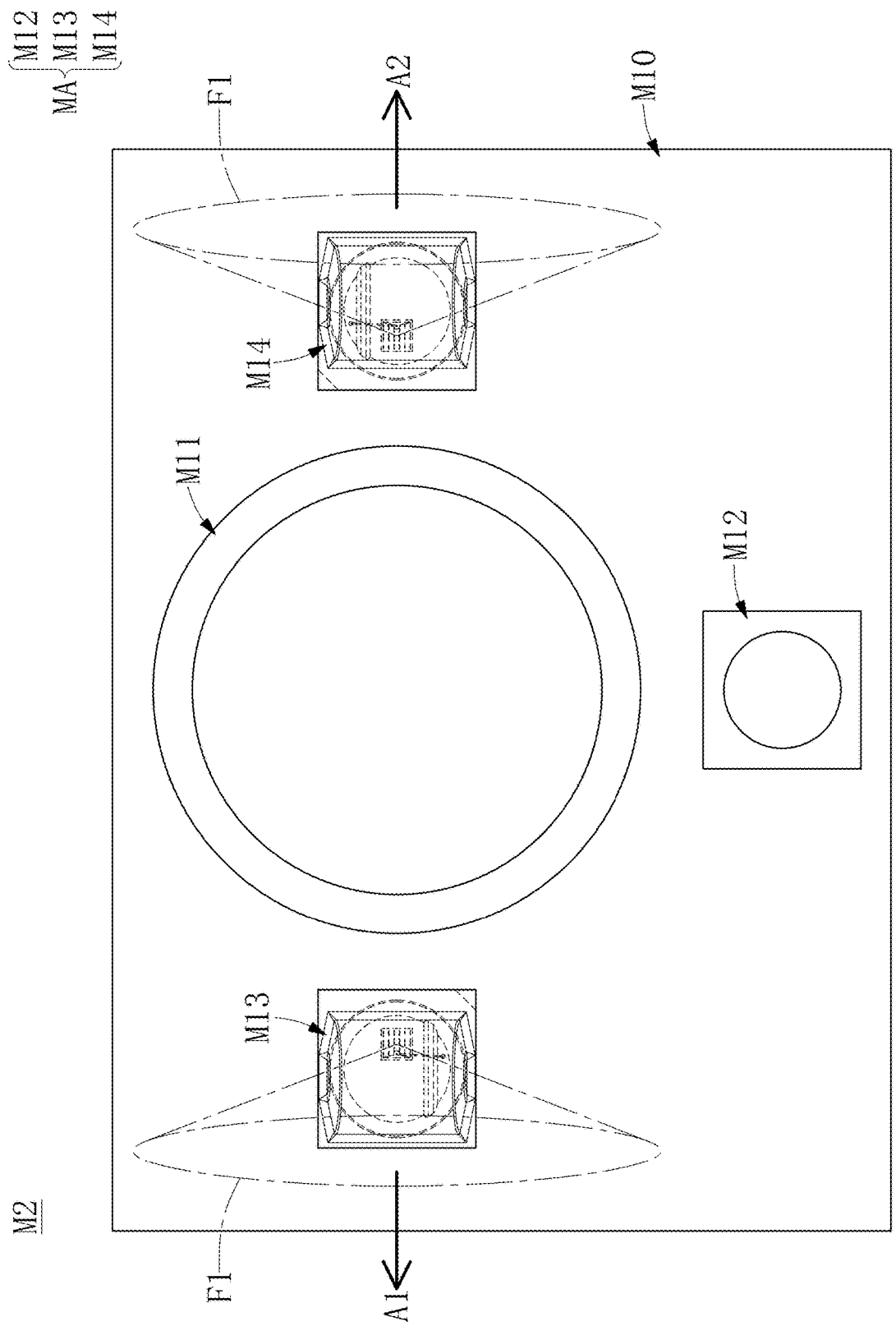
FIG. 15 is a schematic top view of an image capturing module according to a second embodiment of the present disclosure.
Figure 16:
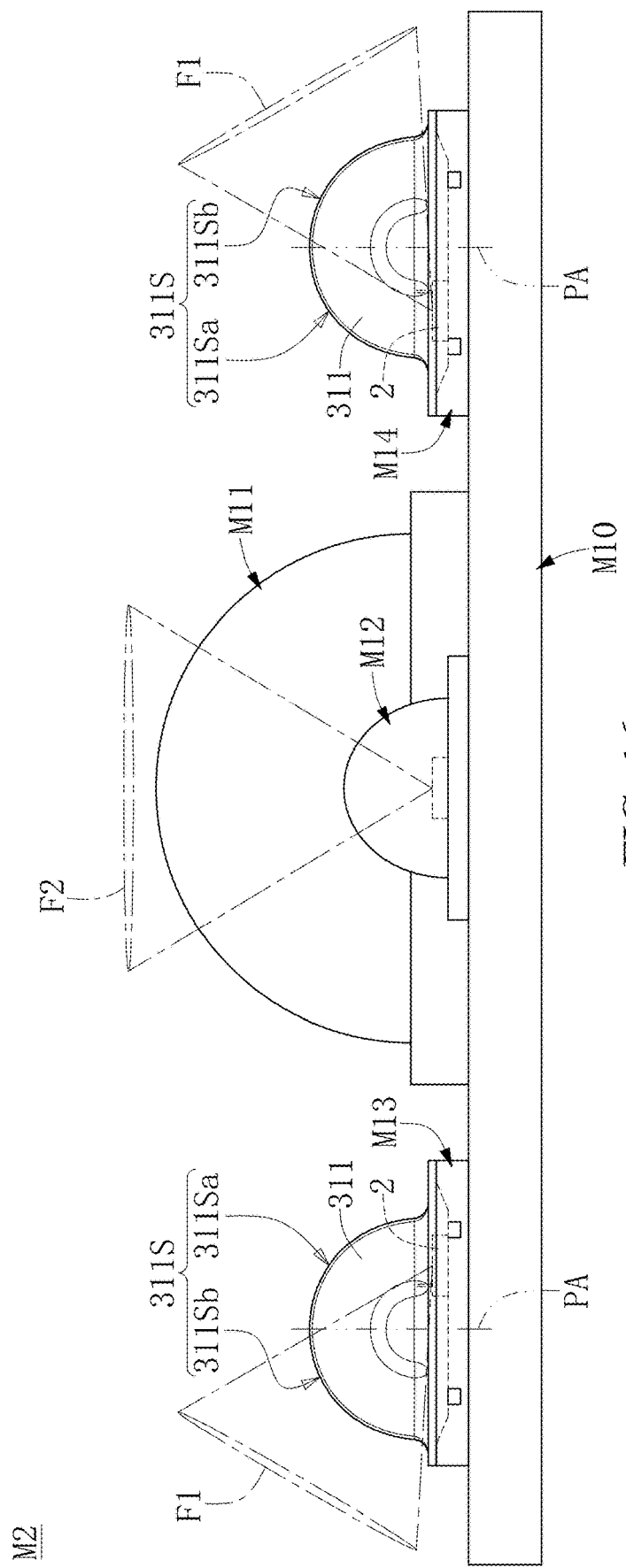
FIG. 16 is a schematic side view of the image capturing module according to the second embodiment of the present disclosure.

Reference is made to FIG. 15 and FIG. 16, which are schematic top and side views of an image capturing module according to a second embodiment of the present disclosure, respectively. Elements of an image capturing module M2 in the instant embodiment that are the same as those of the image capturing module M1 in the previous embodiment are denoted by the same or similar reference numerals, and will not be reiterated herein. In the instant embodiment, the two off-axis light-emitting devices M13, M14 are arranged to generate two off-axis projection lights F1 respectively with two opposite projection directions A1, A2. That is to say, in the instant embodiment, the angle α between the projection directions A1, A2 is 180 degrees.

Reference is made to FIG. 16. In the instant embodiment, in any one of the off-axis light-emitting devices M13, M14, a curved light emergent surface 311S is divided into a first region 311Sa and a second region 311Sb, and the light-emitting chip 2 is arranged under the first region 311Sa. In the instant embodiment, the two off-axis light-emitting devices M13, M14 are arranged with the first regions 311Sa thereof facing toward each other, such that the two off-axis projection lights F1 generated by the two off-axis light-emitting devices M13, M14 are respectively directed in two opposite projection directions A1, A2.

Figure 17:
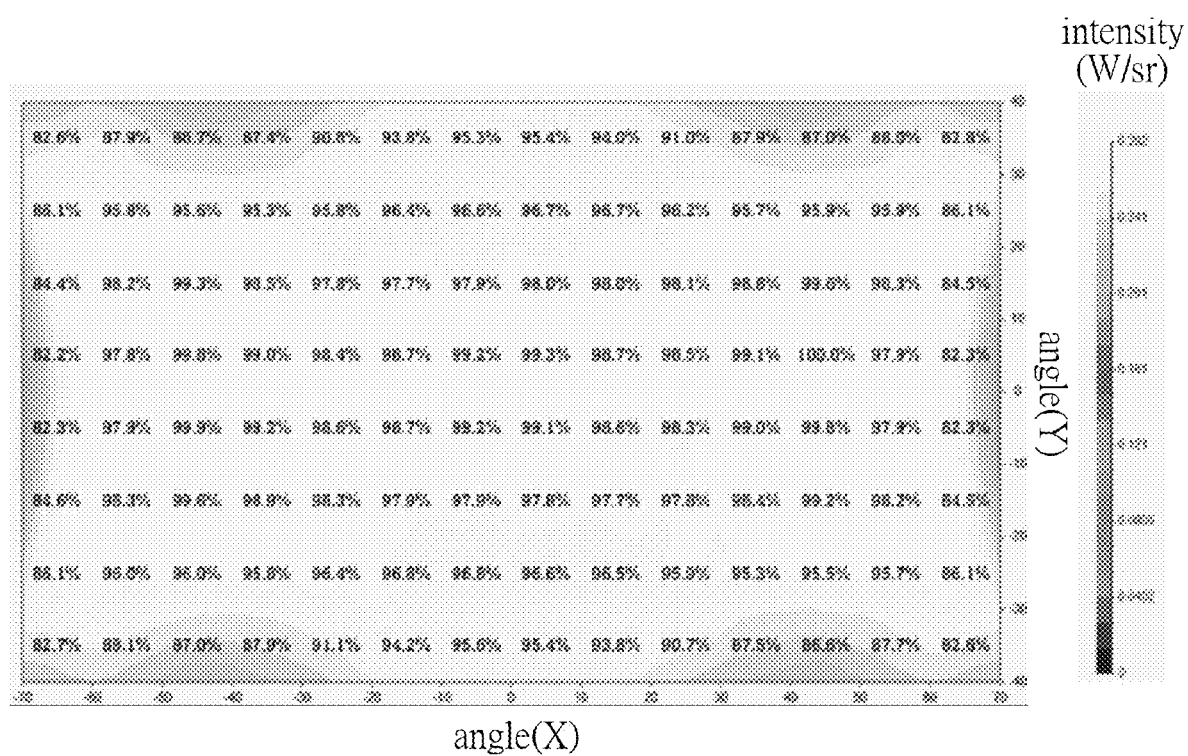
FIG. 17 is a far-field intensity distribution generated by a light-emitting assembly of the image capturing module according to the second embodiment of the present disclosure.

Furthermore, the on-axis projection light F2 generated by the on-axis light-emitting device M12 is projected away from the circuit board M10. The two off-axis projection lights F1 and the on-axis projection light F2 complement each other in use. Reference is made to FIG. 17, which is a far-field intensity distribution generated by a light-emitting assembly of the image capturing module according to the second embodiment of the present disclosure. The optical field distribution formed by projecting the light source generated by the light-emitting assembly MA onto the reference plane has high uniformity. It should be noted that as shown in FIG. 17, each of the radiant intensities that are denoted in different regions has been normalized. As shown in FIG. 17, in the far-field intensity distribution of the light source generated by the light-emitting assembly, a difference between a radiant intensity (99.3%) measured at a central region and a radiant intensity (82.6% to 82.8%) measured at a corner region can be less than 20%.

Figure 18:
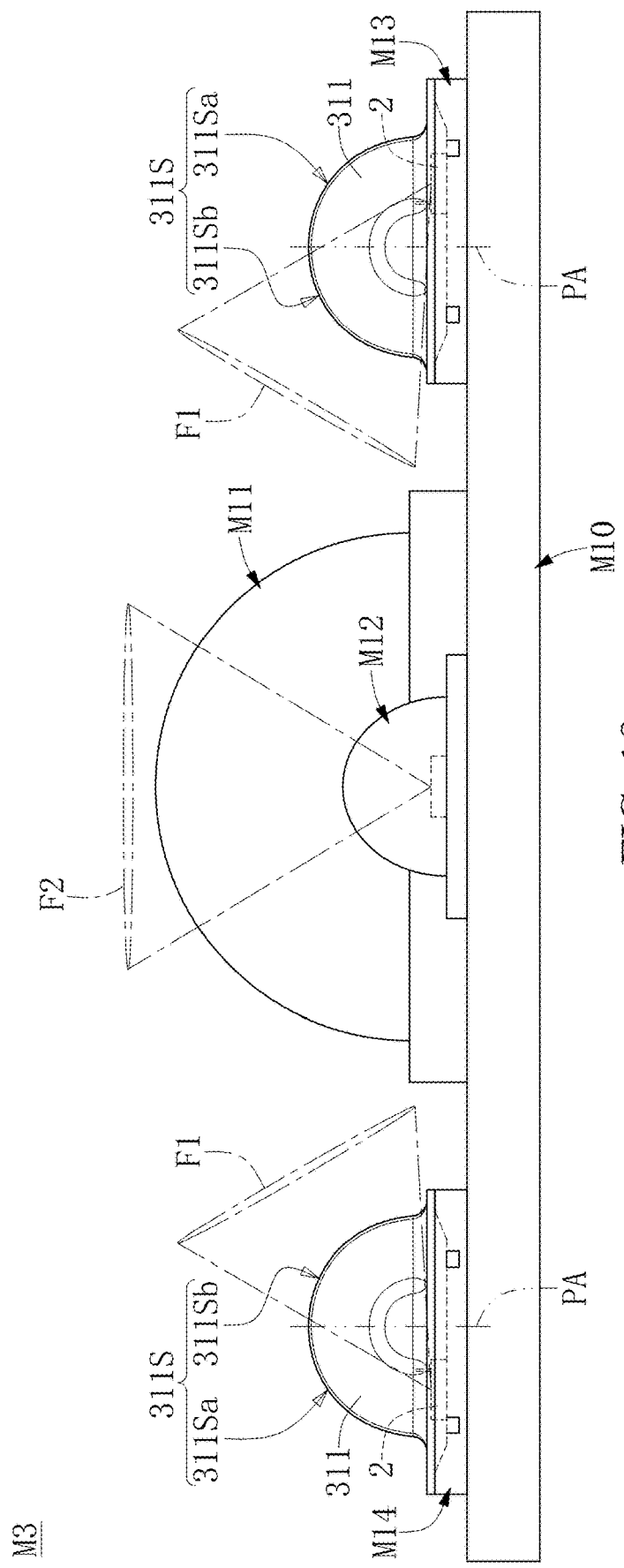
FIG. 18 is a schematic side view of an image capturing module according to a third embodiment of the present disclosure.

However, the present disclosure is not limited to the example provided herein. Reference is made to FIG. 18, which is a schematic side view of an image capturing module according to a third embodiment of the present disclosure. Elements of an image capturing module M3 in the instant embodiment that are the same as those of the image capturing module M1 in the previous embodiment are denoted by the same or similar reference numerals, and will not be reiterated herein. In the instant embodiment, the two off-axis light-emitting devices M13, M14 are arranged to generate two off-axis projection lights F1 respectively with two opposite projection directions A1, A2.

However, in the instant embodiment, the two off-axis light-emitting devices M13, M14 are arranged with the second regions 311Sb thereof facing toward each other, so that the two off-axis projection lights F1 generated by the two off-axis light-emitting devices M13, M14 have two opposite projection directions A1, A2. In other words, the two off-axis light-emitting devices M13, M14 are arranged with the first regions 311Sa thereof facing away from each other.

It should be noted that, even though configuration orientations of the two off-axis light-emitting devices M13, M14 are exchanged, compared to a conventional light-emitting assembly used in a camera device, the optical field distribution formed by projecting the light source generated from the light-emitting assembly MA of the embodiment in the present disclosure onto the reference plane is more uniform.

Figure 19:
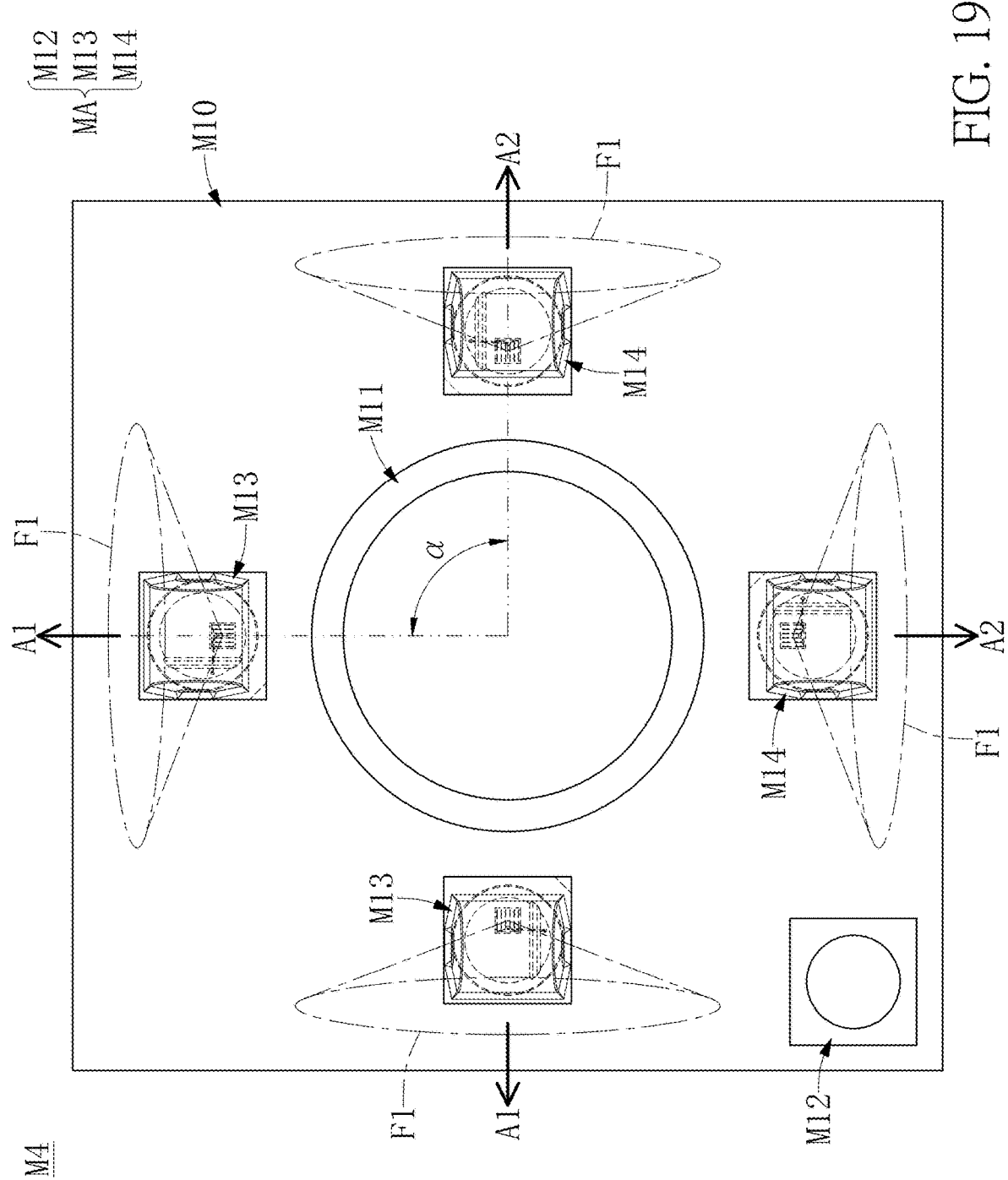
FIG. 19 is a schematic top view of an image capturing module according to a fourth embodiment of the present disclosure.

Reference is made to FIG. 19, which is a schematic top view of an image capturing module according to a fourth embodiment of the present disclosure. The light-emitting assembly MA includes an on-axis light-emitting device M12 and a plurality of off-axis light-emitting devices M13, M14. In the instant embodiment, four off-axis light-emitting devices M13, M14 that respectively face in different directions are used in the light-emitting assembly MA, but the present disclosure is not limited thereto. It should be noted that the quantity of the off-axis light-emitting devices M13, M14 is greater than or equal to 2, and can be an odd or even number. That is to say, the quantity of the off-axis light-emitting devices M13, M14 can be 2n or 2n+1, in which n≥1.

Figure 20:
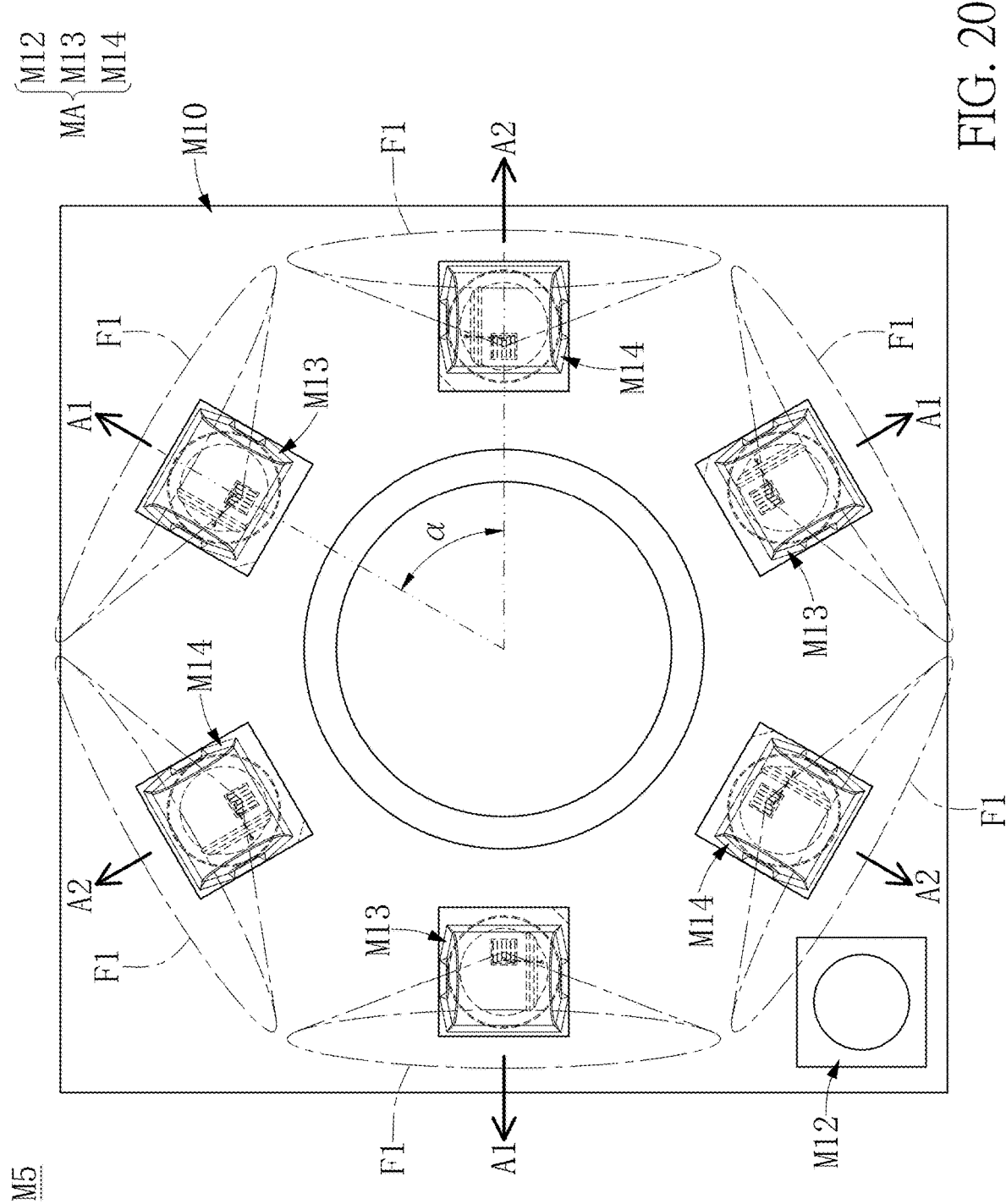
FIG. 20 is a schematic top view of an image capturing module according to a fifth embodiment of the present disclosure.
Figure 21:
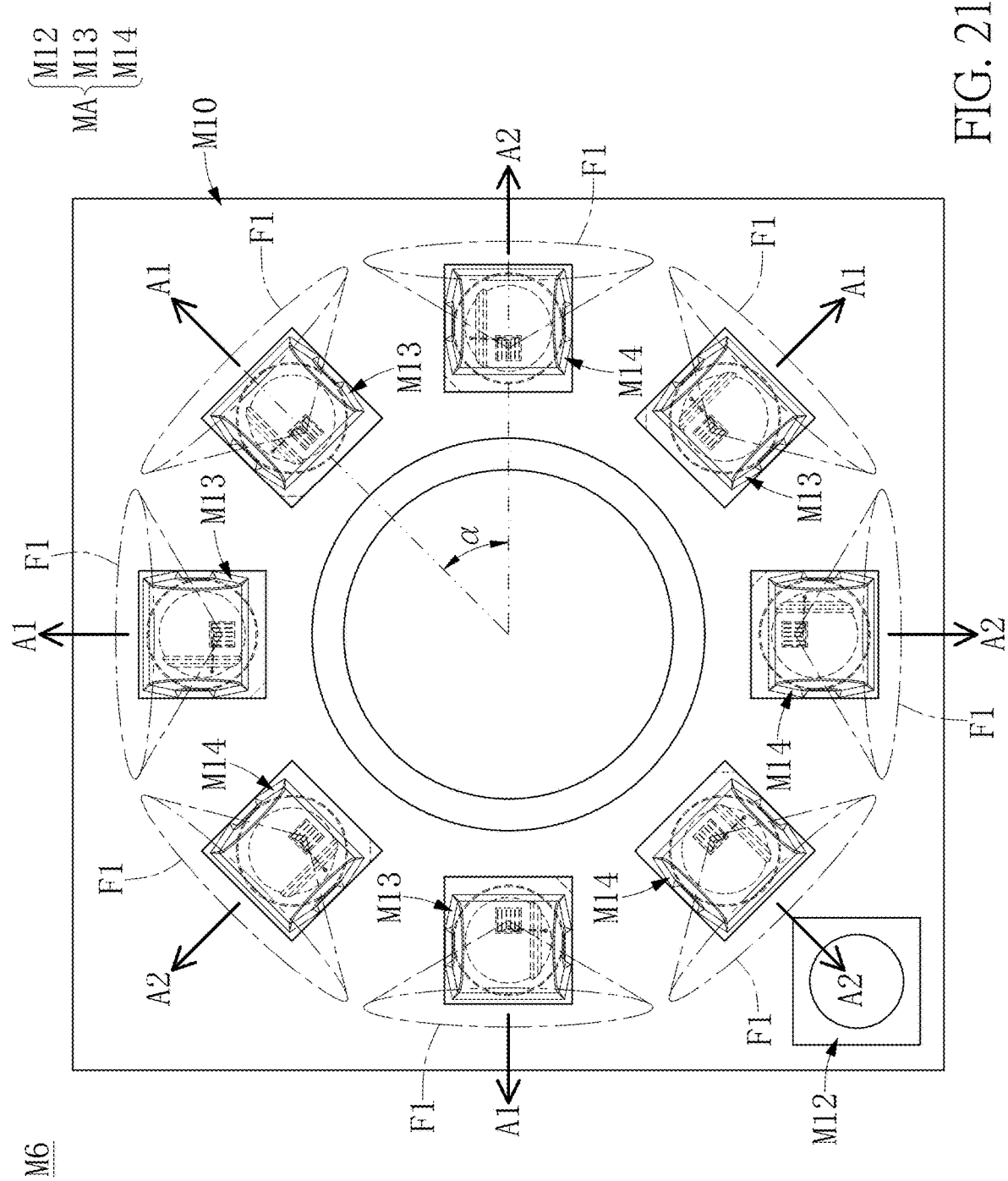
FIG. 21 is a schematic top view of an image capturing module according to a sixth embodiment of the present disclosure.
Figure 22:
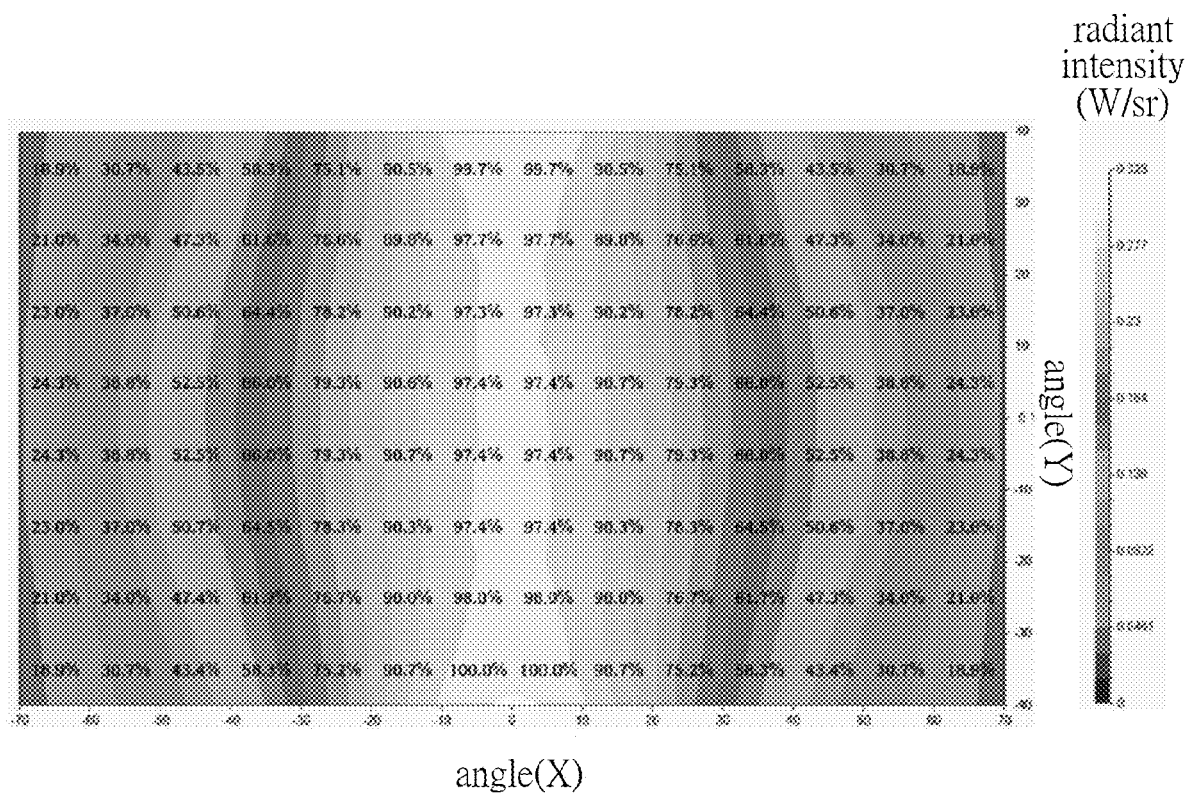
FIG. 22 is a far-field intensity distribution generated by a plurality of conventional LEDs.

Furthermore, in the instant embodiment, the angle α between the projection directions A1, A2 of any two adjacent ones of the off-axis light-emitting devices M13, M14 is 90 degrees, but the present disclosure is not limited thereto. Reference is made to FIG. 20 and FIG. 21, which are schematic top views of an image capturing module according to a fifth and sixth embodiments of the present disclosure. In the embodiment shown in FIG. 20, the angle α between the projection directions A1, A2 of any two adjacent ones of the off-axis light-emitting devices M13, M14 is 60 degrees. In the embodiment shown in FIG. 21, the angle α between the projection directions A1, A2 of any two adjacent ones of the off-axis light-emitting devices M13, M14 is 45 degrees.

Accordingly, as long as two of the off-axis light-emitting devices M13, M14 are arranged so that the angle α between the projection directions A1, A2 thereof is 180 degrees, the orientations of the other off-axis light-emitting devices M13, M14 are not limited in the present disclosure.

Beneficial Effects of the Embodiments

In conclusion, one of the advantages of the off-axis light-emitting device and the image capturing module using the same provided by the present disclosure is that, by virtue of "the dome portion 31 being arranged in an optical path of the light beam and extending in a first direction D1 to form an elongated shape," "the dome portion 31 having a first reference plane PA that passes through two opposite side surfaces 310 of the dome portion 31" and "the first reference plane PA being offset from a geometric center C2 of the light-emitting chip 2 in a second direction D2, so that the light beam passing through the dome portion 31 forms an off-axis projection light F1," the optical energy can be limited within a specific region.

Furthermore, in any one of the image capturing modules M1 to M3 of the embodiments provided in the present disclosure, by virtue of "the light-emitting assembly MA including an on-axis light-emitting device M12 and two off-axis light-emitting devices M13, M14 that are disposed on the circuit board M10 and arranged to surround the image sensing device M11" and "the two off-axis light-emitting devices M13, M14 are arranged to respectively generate two off-axis projection lights F1 having different projection directions," a brightness distribution of an image captured by any one of the image capturing modules M1 to M3 can be more uniform, and a utilization rate of light energy can be increased.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An off-axis light-emitting device, comprising:
   a substrate having a mounting surface;
   a light-emitting chip for generating a light beam disposed on the mounting surface; and
   an optical element disposed on the mounting surface and including a dome portion,
   wherein the dome portion is arranged in an optical path of the light beam and extends in a first direction to form an elongated shape, and the dome portion has a first reference plane that passes through two opposite side surfaces of the dome portion;

wherein the first reference plane is a cross-sectional plane corresponding to a longitudinal axial centerline of the dome portion, and the dome portion has a symmetrical shape with respect to the first reference plane; and wherein the first reference plane is offset from a geometric center of the light-emitting chip in a second direction, so that the light beam passing through the dome portion forms an off-axis projection light;

wherein the first reference plane is parallel to the first direction and is vertical to the second direction, the dome portion includes a first region and a second region, a radiant intensity in a first measuring region above the first region where the light-emitting chip is placed below is less than a radiant intensity in a second measuring region above the second region where the light-emitting chip is not placed below.

2. The off-axis light-emitting device according to claim 1, wherein one of the first reference plane and the geometric center of the light-emitting chip is offset from a geometric center of the mounting surface, and another one of the first reference plane and the geometric center of the light-emitting chip is aligned with the geometric center of the mounting surface.

3. The off-axis light-emitting device according to claim 1, wherein the mounting surface has a first length in the first direction and a second length in the second direction, and the first reference plane and a geometric center of the mounting surface are offset from each other in the second direction by a first offset distance, and wherein a ratio of the first offset distance to the second length ranges from 0 to 0.3.

4. The off-axis light-emitting device according to claim 1, wherein the mounting surface has a first length in the first direction and a second length in the second direction, and the geometric center of the light-emitting chip and a geometric center of the mounting surface are offset from each other in the second direction by a second offset distance, and wherein a ratio of the second offset distance to the second length ranges from 0 to 0.3.

5. The off-axis light-emitting device according to claim 1, wherein the first reference plane and the geometric center of the light-emitting chip are offset from each other in the second direction by a relative offset distance, and a ratio of the relative offset distance to a width of the dome portion in the second direction is less than 0.8, but is not equal to 0.

6. The off-axis light-emitting device according to claim 1, wherein the first reference plane and the geometric center of the light-emitting chip are offset from each other in the second direction by a relative offset distance therebetween, and the first reference plane and a geometric center of the mounting surface are offset from each other in the second direction by a first offset distance therebetween, and wherein the first offset distance is less than the relative offset distance.

7. The off-axis light-emitting device according to claim 1, wherein one of the side surfaces of the dome portion includes an inclined part, and the inclined part and a vertical reference plane perpendicular to the substrate form an acute angle therebetween ranging from 0 degrees to 25 degrees.

8. The off-axis light-emitting device according to claim 1, wherein one of the side surfaces of the dome portion includes a first inclined part and a second inclined part, and the first inclined part surrounds the second inclined part; and wherein the first inclined part and a vertical reference plane perpendicular to the substrate form a first acute angle therebetween, the second inclined part and the vertical reference plane form a second acute angle therebetween, and the first acute angle is greater than the second acute angle.

9. The off-axis light-emitting device according to claim 8, wherein the optical element further includes a base portion, and the second inclined part has a height relative to the base portion, and wherein the height of the second inclined part is 0.3 to 0.5 times a height of the optical element relative to the base portion.

10. The off-axis light-emitting device according to claim 1, wherein the dome portion has a curved light emergent surface, and the curved light emergent surface has a topmost axial line extending in the first direction, and wherein the topmost axial line is a straight line or has a curvature radius that is equal to or greater than 10 mm.

11. The off-axis light-emitting device according to claim 1, wherein the dome portion has a curved light emergent surface divided into the first region and the second region by the first reference plane, and the light-emitting chip is disposed under the first region.

12. The off-axis light-emitting device according to claim 1, wherein the dome portion has a second reference plane that is parallel to the second direction, and a plane passing through a top end of one of the side surfaces and a geometric center of the mounting surface is defined as a reference plane; and wherein the reference plane and the second reference plane form an angle therebetween, and the angle is less than a critical angle of total internal reflection for the light beam in the dome portion.

13. The off-axis light-emitting device according to claim 1, wherein the mounting surface has a first side edge and a second side edge, the first side edge and the second side edge extend along the first direction and are respectively located at two opposite sides of the substrate, and the first reference plane is closer to the first side edge and farther away from the second side edge.

14. The off-axis light-emitting device according to claim 1, wherein the dome portion includes a column body that extends between the two side surfaces, and a cross-sectional width of the column body in the second direction from one to another one of the two side surfaces is substantially the same.

15. The off-axis light-emitting device according to claim 1, wherein a height to width ratio of the dome portion is from 1:1 to 1:3.

* * * * *